(12) United States Patent
Pearlman et al.

(10) Patent No.: US 10,690,774 B2
(45) Date of Patent: *Jun. 23, 2020

(54) PATHWAY MEASUREMENT DEVICES, SYSTEMS AND METHODS

(71) Applicants: University of Pittsburgh - Of the Commonwealth System of Higher Education, Pittsburgh, PA (US); The United States Government as represented by the Department of Veterans Affairs, Washington, DC (US)

(72) Inventors: Jonathan L. Pearlman, Pittsburgh, PA (US); Eric Joseph Sinagra, Bethel Park, PA (US); Jonathan Aaron Duvall, Verona, PA (US); Joshua D. Brown, Pittsburgh, PA (US); Dianna Rae Stuckey, Butler, PA (US); Tianyang Chen, Shanghai (CN); Ian Patrick McIntyre, Holland, PA (US); Rory Alan Cooper, Gibsonia, PA (US)

(73) Assignees: University of Pittsburgh—Of the Commonwealth System of Higher Education, Pittsburgh, PA (US); The United States Government as represented by the Department of Veterans Affairs, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/111,921

(22) Filed: Aug. 24, 2018

(65) Prior Publication Data
US 2019/0064360 A1 Feb. 28, 2019

Related U.S. Application Data

(63) Continuation of application No. 14/597,721, filed on Jan. 15, 2015, now Pat. No. 10,101,454.

(Continued)

(51) Int. Cl.
*G01C 3/08* (2006.01)
*G01S 17/42* (2006.01)
(Continued)

(52) U.S. Cl.
CPC .............. *G01S 17/42* (2013.01); *G01C 7/04* (2013.01); *G01S 7/4813* (2013.01); *G01S 17/86* (2020.01); *G01S 17/89* (2013.01)

(58) Field of Classification Search
CPC ........ G01S 17/023; G01S 17/89; G01S 17/42; G01S 7/4813; G01C 7/04
(Continued)

(56) References Cited

U.S. PATENT DOCUMENTS 5,107,598 A 4/1992 Woznow
5,353,512 A 10/1994 Theurer
(Continued)

*Primary Examiner* — Mark Hellner
(74) *Attorney, Agent, or Firm* — Bartony & Associates, LLC

(57) ABSTRACT

A pathway measurement system hereof includes a rigid frame and a mobility system attached to the frame. The mobility system includes at least one movable element which is adapted to contact a surface of a pathway via which the frame may be moved relative to the pathway. The pathway measurement system further includes at least one sensor adapted to measure at least one characteristic of a pathway. The pathway measurement system has a first mode of operation in which the mobility system moves the frame along the pathway to move the at least one sensor relative to the pathway. The at least one sensor is connected to the pathway system such that a distance between the at least one sensor and an axis of rotation of one of the moveable elements remains constant in the first mode of operation. In general, the at least one sensor is isolated from any compliance or suspension system.

16 Claims, 13 Drawing Sheets

Related U.S. Application Data

(60) Provisional application No. 61/927,630, filed on Jan. 15, 2014.

(51) Int. Cl.
*G01S 17/89* (2020.01)
*G01C 7/04* (2006.01)
*G01S 7/481* (2006.01)
*G01S 17/86* (2020.01)

(58) Field of Classification Search
USPC .................................................. 356/4.01
See application file for complete search history.

(56) References Cited

U.S. PATENT DOCUMENTS

| | | |
|---|---|---|
| 5,829,149 A | 11/1998 | Tyson |
| 5,859,783 A | 1/1999 | Ytterberg |
| 6,035,542 A | 3/2000 | Woznow |
| 6,618,954 B2 | 9/2003 | Kumazawa |
| 6,682,261 B1 | 1/2004 | Karamihas |
| 6,775,914 B2 | 8/2004 | Toom |
| 7,748,264 B2 | 7/2010 | Prem |
| 7,762,144 B2 | 7/2010 | Walker |
| 7,845,878 B1 | 12/2010 | Godbersen |
| 7,850,395 B1 | 12/2010 | Brenner |
| 8,306,747 B1 | 11/2012 | Gagarin |
| 8,352,188 B2 | 1/2013 | Scott |
| 8,417,423 B2 | 4/2013 | Fudala |
| 9,404,738 B2* | 8/2016 | Toom .................. G01O 7/04 |
| 10,101,454 B2* | 10/2018 | Pearlman ............ G01S 17/023 |
| 2002/0176608 A1 | 11/2002 | Rose |
| 2004/0122580 A1* | 6/2004 | Sorrells ................ G07O 5/008 |
| | | 701/80 |
| 2005/0038627 A1 | 2/2005 | Brimhall |

* cited by examiner

| Surface # | Roughness Code | Picture | PRI (in/ft) |
|---|---|---|---|
| 1 | GREEN | | 0.546 |
| 2 | YELLOW | | 0.661 |
| 3 | YELLOW | | 0.746 |
| 4 | RED | | 0.889 |
| 5 | RED | | 1.021 |

Fig. 8

PATHWAY MEASUREMENT DEVICES, SYSTEMS AND METHODS

CROSS-REFERENCE TO RELATED APPLICATIONS

This application is a continuation application of U.S. patent application Ser. No. 14/597,721, filed Jan. 15, 2015, which claims benefit of U.S. Provisional Patent Application Ser. No. 61/927,630, filed Jan. 15, 2014, the disclosures of which are incorporated herein by reference.

BACKGROUND

The following information is provided to assist the reader in understanding technologies disclosed below and the environment in which such technologies may typically be used. The terms used herein are not intended to be limited to any particular narrow interpretation unless clearly stated otherwise in this document. References set forth herein may facilitate understanding of the technologies or the background thereof. The disclosure of all references cited herein are incorporated by reference.

Title V of the Americans with Disabilities Act of 1990 (ADA) directs the Architectural and Transportation Barriers Compliance Board (Access Board) to create minimum guidelines "to ensure that buildings, facilities, rail passenger cars, and vehicles are accessible, in terms of architecture and design, transportation, and communication, to individuals with disabilities". However, the Access Board has only established one guideline concerning ground surfaces, stating that they "shall be stable, firm, and slip resistant". No guidelines currently exist that relate pathway roughness to pedestrian safety and comfort.

The need for improved pathway regulations continues to grow. Inaccessibility and safety concerns along pedestrian pathways have caused the Access Board to look at the ADA accessibility regulations. A study is being conducted to investigate a correlation between surface roughness of pathways and vibrations and comfort experienced by wheelchair users as they travel over these surfaces. The Access Board will likely publish the Public Rights of Way Guidelines (PROWAG) in 2014 concerning pathway cross slope, running slope, and level change, with a preamble concerning roughness. These ADA regulations are generally accepted as law. However, once the Department of Transportation and/or the Department of Justice accept these regulations, they will become enforceable law. Therefore, cities, municipalities, and property management entities will be required to maintain their pedestrian pathways up to a specific standard, or they will face penalties.

Inertial based systems for determining roughness in roadway have been developed, but are difficult to use in connection with surfaces used by pedestrians and personal mobility devices. Such systems are relatively large and must be moved at a relatively fast rate to minimize the effects of suspension elements, reduce errors and provide analyzable data. Complex algorithms are also required in such system to, for example, account for suspension motion. These sizable, fast moving systems based on inertial measurement systems present a substantial safety risk to normal pedestrian traffic and an extreme safety risk to individuals with disabilities.

SUMMARY

In one aspect, a pathway measurement system hereof includes a (rigid) frame and a mobility system attached to the frame. The mobility system includes at least one movable element which is adapted to contact a surface of a pathway via which the frame may be moved relative to the pathway. The pathway measurement system further includes at least one sensor adapted to measure at least one characteristic of a pathway. The pathway measurement system has a first mode of operation in which the mobility system moves the frame along the pathway to move the at least one sensor relative to the pathway. The at least one sensor is connected to the pathway system such that a distance between the at least one sensor and an axis of rotation of one of the moveable elements remains constant in the first mode of operation. In a number of embodiments, the frame is a rigid structure and is attached to the mobility system with limited or no suspension or dampening elements. In general, the at least one sensor is isolated from any compliance or suspension system. The sensor may, for example, be connected to the frame. The moveable element of the mobility system may, for example, include a wheel, a track (which rotates about at least one wheel), or a caster.

In many instances a pathway or a course to be characterized herein is primarily used as a pedestrian walkway and/or a path for personal mobility devices or vehicles (including, for example, wheelchairs, scooters, walkers, and the like) via which an individual (such as an individual with a mobility or visual impairment) can be driven over the pathway (under either manual or powered propulsion). Such pathways (for example, sidewalks) often, for example, have a width in the range of 30 inches to 72 inches and, typically, have a width of approximately 42 inches to 60 inches. However, the pathway measurement systems hereof can be used to characterize any surface (including, for example, building floors, patios, terraces, airport runways, etc.). Thus, use of the term "pathway" herein includes any surface, and particularly surfaces over which a pedestrian or a personal mobility device may travel.

In a number of embodiments, the at least one characteristic of the pathway is related to change in elevation of the pathway along a length thereof. The at least one sensor may, for example, measure a variable related to surface roughness of the pathway. Roughness may, for example, be set forth as a measure of the change in elevation/profile with length over a predetermined length. Roughness may, for example, be described via a measurement of a profile showing elevation as it varies with longitudinal distance along a travelled course. In addition to roughness, tripping hazards, which can be defined as vertical changes in elevation of a certain threshold occurring over a defined length of pathway (for example, step changes in elevation) may be identified algorithmically by the pathway measurement system. The pathway measurement systems hereof may be adapted to be propelled by at least one of manual power or non-manual power. Non-manual power may, for example, be provided via a drive system including a battery-powered electric motor.

In general, the pathway measurement systems hereof may be moved along a pathway surface at any speed. Unlike inertial systems used on roadways, there is no lower limit to the speed at which the pathway measurement systems is moved. In general, it may be desirable to operate the pathway measurement systems hereof at a speed which is within the range of speeds of pedestrians and personal mobility devices which use the pathway to be characterized. The pathway measurement systems hereof may, thus, be more readily usable at any time during the day or night, including times at which pedestrians and/or personal mobility devices most often use the pathway. In a number of embodiments, the pathway measurement system may travel along the pathway at a speed in the range of approximately 0.1 m/s to approximately 5 m/s or approximately 0.1 m/s to approximately 1.5 m/s.

The pathway measurement system may, for example, have a maximum width (measured orthogonal to the longitudinal axis thereof) of no greater than 48 inches. In a number of embodiments, the maximum width may be no greater than 36 inches or no greater than 24 inches. Such dimensions provides, for example, ease of maneuvering on pathway surfaces that may include pedestrians and/or personal mobility devices thereof. Moreover, many of the pathways to be characterized (for example, sidewalks and pedestrian ways) may have a width in the range of 30 inches to 72 inches.

In a number of embodiments, the at least one sensor is connected to a positioning system which is connected to the frame via which the position of the at least one sensor relative to the frame can be altered (for example, along at least one of the length of the frame or the width of the frame). The pathway measurement system has a first mode of operation as described above in which the mobility system moves the frame along the pathway to move the at least one sensor relative to the pathway and a second mode of operation in which the frame is maintained stationary relative to the pathway and the position of the at least one sensor system relative to the pathway is changed via the positioning system enabling, for example, a very accurate characterization of a potential trip hazard or area of interest In a number of embodiments, the position of the sensor is changed at least along the length (that is, in a direction parallel to the longitudinal axis) of the frame/pathway measurement system.

In a number of embodiments, the at least one sensor measures a distance from the sensor to a surface of the pathway without contacting the pathway. The at least one sensor may, for example, measure the distance from the sensor to the surface of the pathway on the basis of energy reflected from the surface of the pathway to the sensor. In a number of embodiments, the at least one sensor measures the distance from the sensor to the surface of the pathway on the basis of light energy reflected from the surface of the pathway to the sensor. The at least one sensor may, for example, project light which is in line with the direction of travel of the pathway measurement system, orthogonal to the direction of travel of the pathway measurement system or at any angle within the plane of travel of the pathway measurement system.

Many different types of sensors may, for example, be provided on the pathway measurement systems hereof to measure various different aspects or characteristics of the pathway and/or its environment. The pathway measurement system may, for example, further include at least one accelerometer, at least one gyroscope, at least one location system/sensor (for example, a Global Positioning System (GPS) or a Cellular Positioning System (CPS)), at least one camera/image sensor, at least one sensor to measure a distance the pathway measurement system travels along the pathway via the mobility system (for example, a digital encoder), at least one sensor to measure running slope or at least one sensor system to measure cross slope. Other types of sensors which measure ambient conditions surrounding the pathway such as lighting, air quality/content, temperature etc. may be provided. In a number of embodiments, the pathway measurement system includes a location system (for example, a Global Positioning System (GPS) or a Cellular Positioning System (CPS)), to determine the position of the pathway measurement system and associate that position with the at least one characteristic of the pathway. Various sensors can be combined as an operational unit. For example, accelerometers and gyroscopes may be combined in an inertial measurement unit. Various sensors may, for example, be combined in a device such as a smartphone, a tablet computer or similar device.

In embodiments including a positioning system as described above, the positioning system may include a track or tracks along which the at least one sensor travels and a motor to control position of the at least one sensor along the track(s). The pathway measurement system may further include a control system via which the pathway measurement system is placed in the first mode or the second mode. The control system may, for example, include a processor system and a memory system in operative connection with the processing system. The control system may, for example, further include a laser guided system, a GPS guided system, radio controlled remote system, etc.

The pathway measurement system may include a memory system via which, for example, data from the at least one sensor can be stored. A processor system may be provided in operative connection with the memory system. In a number of embodiments, the processor system is adapted to determine a roughness index or a surface characterization associated with a particular type of vehicle from data measured by the at least one sensor. The roughness index or surface characterization may, for example, be determined based upon a wheel diameter or other physical parameters of the particular type of frame and mobility system deployed in the pathway measurement system. In a number of embodiments, a profile of the surface is determined and/or a path of a wheel having the wheel diameter over the profile is determined. The roughness index may, for example, be calculated as the sum of the vertical deviations of the wheel having the wheel diameter normalized by the distance travelled.

In a number of embodiments, the pathway measurement system further includes at least a second sensor, wherein data from the second sensor is used to filter or correct data from the at least a first sensor in determining roughness and/or other surface characteristics. For example, the at least a second sensor can be an accelerometer, a gyroscope, an encoder etc. A Kalman filter may, for example, be used in processing the data.

In another aspect, a method of characterizing a pathway includes providing a pathway measurement system, including a frame and a mobility system attached to the frame. The mobility system includes at least one moveable element which is adapted to contact a surface of the pathway, via which the frame is moveable relative to a pathway. The pathway measurement system further includes at least one sensor adapted to measure at least one characteristic of a pathway. The at least one sensor is connected to the pathway system such that a distance between the at least one sensor and an axis of rotation of that at least one moveable elements remains constant in at least a first mode of operating the pathway measurement system. The method further includes operating the pathway measurement system in the first mode of operation in which the mobility system moves the frame along the pathway to move the at least one sensor relative to the pathway and analyzing data from the pathway measurement system to characterize the pathway. Various aspects of the pathway measurement system may, for example, be as described above.

In a number of embodiments, a dedicated system may be used as a pathway measurement system hereof. In other embodiments, a pathway measurement system hereof can, for example, be incorporated within or formed integrally with a device or system which is usable for another purpose on a pathway to be characterized. For example, the pathway measurement system may be incorporated within or formed integrally with a personal mobility device such as a wheelchair or a scooter, a stroller or carriage for a baby, a cart (such as used by a postal worker or a police officer), a bicycle etc. Data from such systems or devices may, for example, be passively collected during normal operation thereof and analyzed. Such analysis may, for example, occur remotely from such systems or devices. Crowdsourcing, wherein data from a plurality of such devices or system is acquired and analyzed, may be used in characterizing a surface.

In a number of embodiments, the method includes providing a plurality of a pathway measurement systems, each of the pathway measurement systems including a frame, a mobility system attached to the frame which includes at least one moveable element which is adapted to contact a surface of the pathway, and via which the frame is moveable relative to a pathway, and at least one sensor adapted to measure at least one characteristic of a pathway. The at least one sensor is connected to the pathway system such that a distance between the at least one sensor and an axis of rotation of the at least one moveable elements remains constant in a first mode of operation. The method further includes operating each of the plurality of pathway measurement system in the first mode of operation in which the mobility system moves the frame along the pathway to move the at least one sensor relative to the pathway, and analyzing data from each of the plurality of pathway measurement system to characterize the pathway. Data from the plurality of pathway measure systems (which may be devices normally operated for another use or purpose as described above) may be transmitted (for example, wirelessly) to a remote processing system (including one or more processors and an associated memory system including one or more memory units or modules) for processing and/or analysis.

In another aspect, a method includes providing a plurality of a pathway measurement systems, each of the pathway measurement systems including a frame, a mobility system attached to the frame and at least one sensor, operating each of the plurality of pathway measurement system so that the mobility system moves the frame along the pathway to move the at least one sensor relative to the pathway, and analyzing data from each of the plurality of pathway measurement system to characterize the pathway.

In another aspect, a pathway measurement system, includes at least one sensor to measure changes in a level of a surface of a pathway over a length thereof and a processor system to determine a roughness index adapted for a particular type of vehicle from data measured by at least the at least one sensor. The roughness index may, for example, be determined based upon a predetermined wheel diameter or other dimensional parameters of the particular type of vehicle. In a number of embodiments, a profile of the surface is determined and/or a path of a wheel having the wheel diameter over the profile is determined. In a number of embodiments, the roughness index is calculated as the sum of the vertical deviations of the wheel having the wheel diameter normalized by the distance travelled.

In a further aspect, a method of characterizing a pathway includes providing a pathway measurement system including at least one sensor to measure changes in a level of a surface of a pathway over a length thereof and a processor system in communicative connection with the at least one sensor. The method further includes operating the processor to determine a roughness index of the pathway for a particular type of vehicle from data measured by at least the at least one sensor.

In another aspect, a pathway measurement tool, device or system hereof includes a frame, and at least one sensor connected to a positioning system which is connected to the frame via which the position of the at least one sensor relative to the frame can be altered along a length of the frame. The pathway measurement system has a mode of operation in which the frame is maintained stationary relative to the pathway and the position of the at least one sensor system relative to the pathway is changed via the positioning system.

In another aspect, a method of characterizing a pathway includes providing a pathway measurement system including a frame, a mobility system attached to the frame via which the frame may be moved relative to a pathway, and at least one sensor adapted to measure at least one characteristic of a pathway (for example, adapted to measure roughness via measurement of a distance between the at least one sensor and the surface of the pathway over a length of the pathway). The at least one sensor is connected to a positioning system which is connected to the frame via which the position of the at least one sensor relative to the frame can be altered along a length of the frame. The method further includes operating the pathway measurement system in a first mode of operation in which the mobility system causes the frame to travel along or relative to the pathway to move the at least one sensor relative to the pathway, and operating the pathway measurement system in a second mode of operation in which the frame is maintained stationary (relative to the pathway) and the position of the at least one sensor system relative to the path is changed via the positioning system.

In another aspect, a method of characterizing a pathway includes providing a pathway measurement system including a frame, and at least one sensor adapted to measure at least one characteristic of a pathway. The at least one sensor is connected to a positioning system which is connected to the frame via which the position of the at least one sensor relative to the frame can be altered along a length of the frame. The method further includes operating the pathway measurement system in a mode of operation in which the frame is maintained stationary (relative to the pathway) and the position of the at least one sensor system relative to the path is changed via the positioning system.

In another aspect, a pathway measurement system hereof includes a frame, a mobility system attached to the frame via which the frame may be moved relative to a pathway, and at least one sensor attached to the frame so that the position of the sensor is fixed relative to the mobility system. The sensor is adapted to measure a distance from the sensor to a surface of a pathway without the sensor contacting the surface of the pathway.

In another aspect, a method of characterizing a pathway includes providing a pathway measurement system including a frame, a mobility system attached to the frame via which the frame may be moved relative to a pathway, and at least one sensor attached to the frame so that the position of the sensor is fixed relative to the mobility system (for example, a distance between the at least one sensor and a fixed point, line or plane on the mobility system remains constant in at least a first mode or operation). The sensor is adapted to measure a distance from the sensor to a surface of the pathway without the at least one sensor contacting the surface of the pathway. The method further includes moving the at least one sensor relative to a pathway and collecting data from the sensor of the distance from the sensor to the surface of the pathway at a plurality of positions along the pathway.

The present tools, devices, systems, and methods, along with the attributes and attendant advantages thereof, will best be appreciated and understood in view of the following detailed description taken in conjunction with the accompanying drawings.

BRIEF DESCRIPTION OF THE DRAWINGS

FIG. 8 illustrates the results of a characterization or profiling of a representative group of city pathways including a photograph from an onboard sensor and a determined pathway roughness index or PRI.

DETAILED DESCRIPTION

Figure 1:
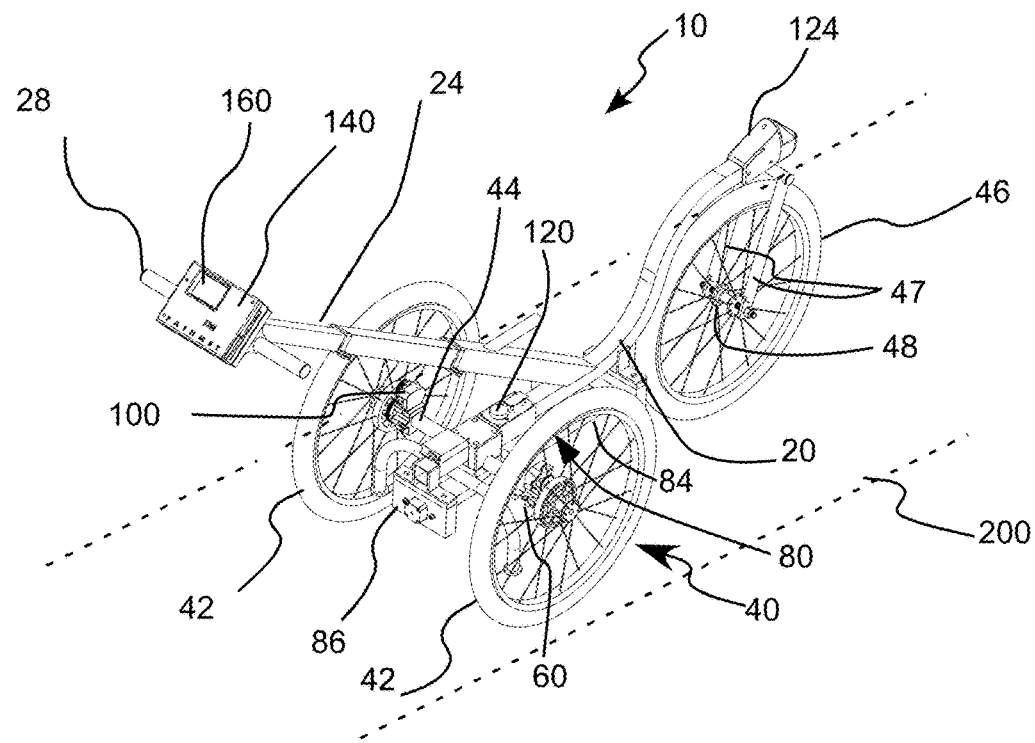
FIG. 1 illustrates a perspective view of an embodiment of a pathway measurement system hereof.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As used herein and in the appended claims, the singular forms "a," "an", and "the" include plural references unless the context clearly dictates otherwise. Thus, for example, reference to "a sensor" includes a plurality of such sensors and equivalents thereof known to those skilled in the art, and so forth, and reference to "the sensor" is a reference to one or more such sensors and equivalents thereof known to those skilled in the art, and so forth. Recitation of ranges of values herein are merely intended to serve as a shorthand method of referring individually to each separate value falling within the range. Unless otherwise indicated herein, and each separate value as well as intermediate ranges are incorporated into the specification as if it were individually recited herein. All methods described herein can be performed in any suitable order unless otherwise indicated herein or otherwise clearly contraindicated by the text.

In a number of embodiments hereof, devices, systems and methods hereof measure surface characteristics and locations associated with pedestrian and/or vehicle accessibility (including, for example, level change, roughness, running slope, cross slope, trip hazards, retaining walls and structures, light levels, sound levels, crossing signal, and GPS locations). Pedestrians and vehicles are susceptible to dangers associated with, for example, excess roughness and/or slope. Vehicles for which pathways are characterized may, for example, include personal mobility devices such as a wheelchairs, scooters, and strollers etc. The running slope of a pathway is the slope in the standard direction of travel along the pathway. The cross slope is the slope or inclination of the pathway perpendicular to the running slope. In general, roughness of a surface such as a pathway is a measure of the texture and is typically quantified by vertical deviations of the surface from its ideal, flat form where such vertical deviations and the area of such deviations may, for example, define trip or other hazards.

The pathway measurement tools, devices, systems and methods hereof enable profiling of a surface of a pathway such as a pedestrian pathways with, for example, a focus on accessibility. Once again, the tool, devices, systems and methods hereof may, for example, measure, characteristics relative to current ADA standards such as running slope, cross slope, and level change (or lippage). In a number of embodiments, surface profile can, for example, be measured with a resolution less than or equal to 6.35 mm, with a resolution less than or equal to 4 mm, with a resolution less than or equal to 2 mm, or even with a resolution less than or equal to 1 mm. The importance of measuring roughness with 1 mm resolution relates to ASTM standards that are in development for pathway roughness related to accessibility. Currently available systems are capable of measuring surface profile with resolution greater than or equal to 0.25 in. (6.35 mm).

Figure 2:
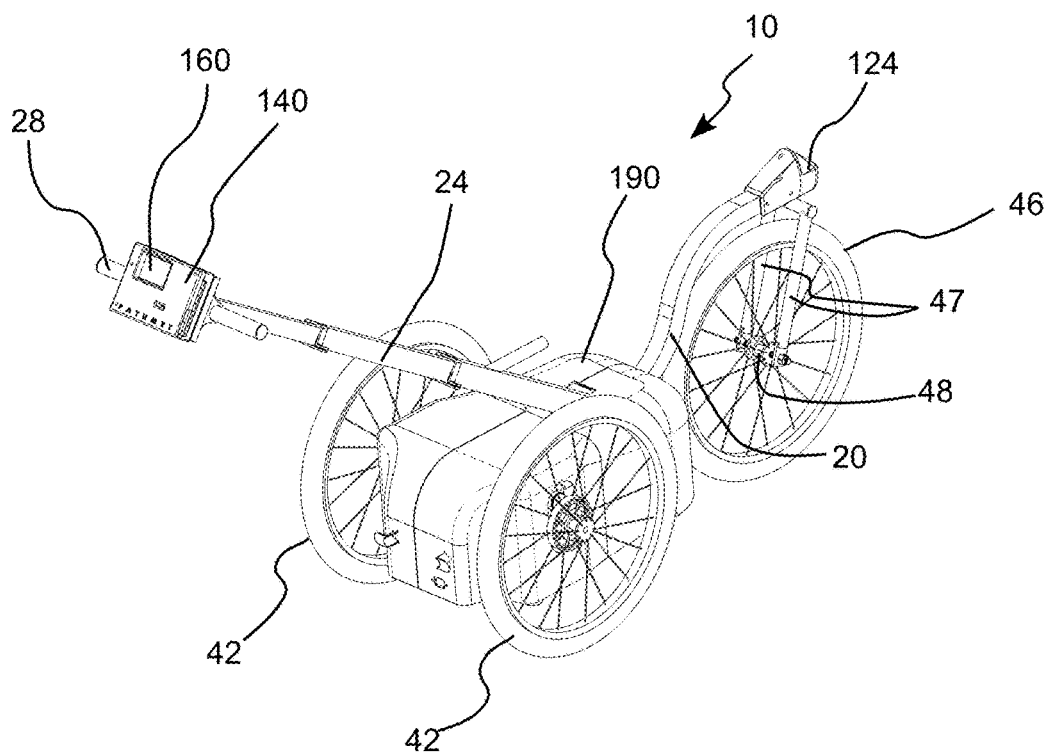
FIG. 2 illustrates another perspective view of the pathway measurement system of FIG. 1 with an enclosure covering at least a portion thereof.

FIGS. 1 and 2 illustrates an embodiment of a pathway measurement tool, device or system 10 hereof. In a number of embodiments, pathway measurement system 10 includes a frame 20 and a mobility system 40 attached to frame 20 via which frame 20 (and, thereby pathway measurement system 10) may be moved relative to a pathway 200 (represented in broken or dashed lines in FIG. 1. Pathway measurement system 10 further includes at least one sensor 60 adapted to measure at least one characteristic of a pathway. In the illustrated embodiment, sensor 60 (which may be a sensor system including a plurality or array of sensor) is connected to a positioning system 80, which is connected to frame 20. The position of sensor 60 relative to frame 40 can be altered along a length of at least a portion of frame 20 via positioning system 80. Pathway measurement system 10 may, for example, have a first mode of operation in which the mobility system 40 moves the frame 20 along the pathway 200 to move sensor 60 relative to pathway 200 and a second mode of operation in which frame 20 is maintained stationary relative to pathway 200 and the position of sensor or sensor system 60 relative to pathway 200 is changed via positioning system 80.

Mobility system 40 may, for example, include, a plurality of wheels, tracks or other mobility systems or propulsion devices as known in the art. In a number of embodiments, the mobility system includes a plurality of wheels. In the embodiment of FIGS. 1 and 2, mobility system 40 includes two rear wheels 42 and a single front wheel 46. Rear wheels 42 are placed in operative connection with frame 20 via a rear axle 44. Front wheel 46 is placed in operative connection with frame 20 via extending members 47 and a front axle 48 extending there between. The mobility system may be adapted to propel the pathway measurement systems hereof manually and/or under power (for example, through a motorized or robotic mechanisms) as known in the drive mechanism arts. The mobility systems may, for example, be controlled utilizing remote control, mobile devices and GPS guidance systems etc.

Sensor(s) included on the pathway measurement systems may, for example, be virtually any type of sensor. Sensor(s) used to characterize the surface of pathway 200 may for example, include a sensor to measure a variable related to pathway roughness, pathway inclination, pathway decay etc. Sensor 60 to characterize the surface of a pathway may, for example, use energy such as light energy. For example, light energy reflected from a surface of pathway 200 may be processed to determine a profile setting forth changes in elevation of the surface of pathway 200 over a length thereof. In a number of embodiments, laser light is used. Sensor 60 may, for example, include a laser range finding system, or a LIDAR device or system. LIDAR, which stands for Light Detection and Ranging, use light pulses (typically, laser light pulses) to determine three-dimensional characteristics of surfaces. One or more cameras may, for example, be used to photograph or video the surface and the resultant photographs or videos can be processed using software techniques known in the software arts to determine a surface profile. A sensor or sensors hereof may, for example, be incorporated by docking or affixing a smartphone or similar device which can include a variety of sensors including, but not limited to, accelerometers, location sensors based on GPS and cell tower triangulation, cameras, luxmeters, gyroscopes, and magnetometers, to the frame of the pathway measurement system. In this embodiment, the smartphone may provide the sensors, computing, data storage and data transmission functions of the pathway measurement system. The pathway measurement systems hereof may further include sensors for determining characteristic of a pathway (or its surroundings) other than surface conditions. For example, the pathway measurement systems hereof may include one or more sensors to detect the presence of methane gas, RADON, and/or other substances. Likewise, one or more sensors may be provide to detect ambient light and/or other conditions.

As described above, sensor 60 of pathway measurement system 10 measures a variable related surface roughness of pathway 200. In a number of such embodiments, sensor 60 measure the variable related to surface roughness (for example, a distance from sensor 60 to a surface of pathway 200) without contacting pathway 200. Energy such as light energy may, for example, be used to measure a variable related to surface roughness without contacting the pathway. A laser range finding sensor or a LIDAR device may, for example use ultraviolet, visible light, or near infrared light to image objects such as pathway 200. Two types of LIDAR detection schemes: "incoherent" or direct energy detection (which may primarily be an amplitude measurement) and "coherent" detection (which may, for example, be best suited for Doppler, or phase sensitive measurements) may, for example, be used in connection with pathway measurement system 10. Coherent systems often use optical heterodyne detection. Optical heterodyne detection is more sensitive than direct detection and allows a LIDAR system to operate at lower power. However, such systems require more complex transceiver systems.

The position of sensor 60 on frame 40 may, for example, be fixed in height relative to mobility system 40, and sensor 60 may be adapted to measure a distance from sensor 60 to the surface of pathway 200 to determine an elevation profiled over a length of pathway 200. As described above, sensor 60 may, for example, measure the distance from sensor 60 to the surface of pathway 20 on the basis of energy reflected from the surface of pathway 200 to sensor 60. Once again, sensor 60 may, for example, include a laser or a LIDAR sensor (or a plurality or a matrix thereof). The laser or LIDAR sensor may, for example, project a point of light on the surface of pathway 200 or a line of light on the surface of pathway 200 (via which roughness of an area of pathway 200 having the width of the line may be determined). A laser displacement measurement tool may, for example, be directed or pointed perpendicular to the surface to measure the distance from the laser to the surface.

The pathway measurement system may, for example, further include at least one sensor or sensor system 100 (such as an encoder) to measure a distance pathway measurement system 10 travels along pathway 200 via mobility system 40. Providing, for example, an encoder in connection with each of rear wheels 42 may provide for measurement of distance traveled as well as turning/attitude. In a number of embodiments, pathway measurement system 10 further includes at least one of a sensor or sensor system to measure running slope or a sensor or sensor system to measure cross slope. Such sensors and other sensors which may be included in pathway measurement system 10 are represented collectively as sensor system 120 in FIG. 1. An accelerometer and/or inclinometer for acceleration and incline/slope readings may, for example, be used.

As described above, pathway measurement system 10 may include numerous sensors integrated into an embedded design. In a representative embodiment of pathway measurement system 10 used in a number of studies of systems hereof, sensor 60 was a RIFTEK RF603 laser displacement measurement tool (available from Riftek Ltd. Of Minsk, Republic of Belarus) capable of measuring up to 9.4 kHz. A sensor 100 (an S5 optical shaft encoder, available from US Digital of Vancouver, Wash. US) was provided in operative connection with each of rear wheels 42. Sensor 60 was oriented perpendicular to the ground and, using a triangulation technique and trigonometry, measured the distance to the ground. Sensors or encoders 100 measured, for example, the distance travelled by pathway measurement system 10. The studied embodiments of pathway measurement system 10 further included a camera, a GPS system and a 6 degree of freedom inertial measurement unit or IMU. An inertial measurement unit is an electronic device that measures and provides data upon, for example, the system's velocity, orientation, and gravitational forces, using, for example, a combination of accelerometers and gyroscopes (and sometimes also magnetometers). Inertial measurement units detect the rate of acceleration using one or more accelerometers, and detect changes in rotational attributes such as pitch, roll and yaw using one or more gyroscopes. A magnetometer may, for example, be provided to calibrate against orientation drift. Data from sensor 60 (as, for example, corrected or filtered using data from one or more other sensors such as an accelerometer, a gyroscope or an encoder) and sensors 100 provided a profile of the measured surface of various pathways.

In a number of embodiments, all the sensors of were integrated into or placed in communicative connection with a customized electronics circuit board within an electronics enclosure 140 to collect data. Other electronic components were also integrated with the electronics circuit board, For example, a thin-film-transistor (TFT) touchscreen display 160 operated as an interface between the user (a user interface) of pathway measurement system 10 and the sensors thereof. In a number of embodiments, display 160 displayed a graph of the profile during data collection for real-time feedback. Pathway measurement system 10 may include many different types of user interfaces. Such user interfaces may, for example, include one or more touchscreen interfaces and/or other displays as described above, keyboard or keypad interfaces, dedicated smartphone interfaces (which may, for example, run a specific application for control and/or data handling of pathway measurement system 10), audio interfaces for collection of specific characteristics related to specific event markers such as voice recognition software systems such as SIRI® (available from Apple, Inc. of Cupertino, Calif.) or DRAGON® Software (available from Nuance Communications of Burlington, Mass.), and/or tactile interfaces that identify specific event markers, etc. to complete processing and data collection. The sensors of pathway measurement system 10 were placed in operative or communicative connection with a processor system or a controller system 164 and one or more memory systems or modules 166 (for example, one or more microSD cards, SD cards, flash drives, or hard drives) as illustrated schematically in FIG. 3. In a number of representative embodiments, data processing was accomplished using processor system 164 including two dsPIC33EP512MU810 microprocessors or microcontrollers (available from Microchip Technology Inc., of Chandler, Ariz. US). In addition, a memory system 166 including two microSD cards in operative connection with the microcontrollers of processor system 164 was used for data collection.

In a number of embodiments, data collection was achieved through serial communication between the microcontrollers and the sensors. The microcontrollers collected one byte of data at a time, alternating between sensors (for example, between sensor 60 and sensor 100). This methodology assists in ensuring that all data were collected by a one-to-one ratio between the sensors. A time stamp was recorded with every byte for accurate timing. The microcontroller collected, on average, but no less than, one reading from sensor 60 and one reading from sensor 100 every millisecond. This result was based on a speed of pathway measurement system 10 of 1.0 m/s±10%, which is one recommended propulsion speed. If more than one reading per millisecond is recorded, the data may be down sampled by averaging the numbers for that specific millisecond. Therefore, the data is collected at 1000 Hz sampling rate, resulting in 1 mm resolution.

In a number of representative embodiments, frame 20 includes a square tube steel frame. Other materials, such as aluminum, polymers, polymer composites, etc., may, for example, be used to decrease the weight or increase the rigidity of the frame. A telescoping, adjustable handle bar 24 extends from frame 20 to the user for comfortable operation. The pathway measurement system may, for example, further include a handle 28 via which a user can apply force to pathway measurement system 10 to cause mobility system 40 to travel along pathway 20. In a number of embodiments, electronics enclosure 160 is connected to handle 28. As described above, enclosure 140 may, for example, include display 160 such as a touch screen display or smart phone interface in operative connection with processor system 164. One or more power sources such as a battery or battery array 180 (see FIG. 3; for example, a rechargeable battery or an RF energy harvesting system) may be provided within the enclosure or elsewhere on the pathway measurement system 10.

In a number of embodiments, the control system of the pathway measurement systems hereof may include a personal communication device such as a tablet computer or smartphone. As used herein, the term "personal communications devices" refers generally to mobile devices which include a communication system, a processor system, one or more user interfaces (for example, a visual feedback system including a touchscreen or other display, an auditory feedback system, and a tactile feedback system etc.) and an operating system capable of running general-purpose applications. Examples of personal communications devices include, but are not limited to, smartphones, tablet computers and custom devices. As used herein, the term "tablet computer" or tablet, refers to a mobile computer with a communication system, a processor system, at least one user interface as described above (typically including a touchscreen display), and an operating system capable of running general-purpose and specially developed custom applications in a single unit. As used herein, the term "smartphone" refers to a cellular telephone including a processor system, at least one user interface as described above (typically including a touchscreen display), and an operating system capable of running general-purpose and specially developed custom applications. Such personal communication devices are typically powered by rechargeable batteries and are housed as a single, mobile unit. A number of representative embodiments of systems and/or methods hereof may, for example, include a smartphone with customized user interface software to form at least a portion of the control system.

In a number of studied embodiments, wheels 42 and 46 were 22-inch solid wheelchair tires. Solid tires were selected to eliminate sources of error that might be experienced with pneumatic tires through a variation in tire pressure. Front wheel 46 operated as a caster, allowing pathway measurement system 10 to make turns relatively easily. All three wheels were readily removable for increased portability and configurability. A three-wheeled rolling design was selected to achieve user satisfaction and user friendliness. In certain embodiments, a four-wheeled design may provide advantages for use in connection with long, linear pathway measurements (such as an airport runway, or a manufacturing environment). In another embodiment, a treaded, tracked system may be used. Such a system would be beneficial in reducing or eliminating errors experienced by traversing rough terrain with wheels. However, a treaded, tracked system would be required to be a powered or robotic system to propel the tracks, which would increase costs. Use of a stationary, long railway track would completely eliminate errors caused by wheels since the track would be stationary on the ground. In addition, data could be collected in one long pass over the surface. However, the time and effort required to set up such a system would be significant. The manually operated rolling device illustrated in FIGS. 1 and 2 provide speed, while maintaining accuracy and keeping costs low. As illustrated in FIG. 2, an enclosure 190 was provided to enclose a portion of pathway measurement system 10 including positioning system 80.

In a number of embodiments, positioning system 80 includes a track system including one or more tracks or rods 84 along which a carriage to which sensor 60 is connected travels in the second mode as described above. In a number of embodiments, a motor 86 (and/or other system to impart motion and/or to control position) to control position of sensor 60 along the track system (for example, via a lead screw in operative connection with the motor as known in the positioning arts). In general, maintaining frame 40 stationary relative to pathway 200 and moving sensor 60 relative to frame 40 (and thereby relative to pathway 200) enable more accurate results and/or greater resolution. For example, operation in the second mode reduces or removes the potential for errors associated with any mobility system (for example, including wheels, tracks etc.) traveling over pathway 200. The speed of motion of sensor 60 relative to pathway 200 can be accurately controlled and the complex vertical motion of system 10 associated, for example, with wheels rolling over the surface of pathway 200 is removed. Pathway measurement system 20 may, for example, further include a control system including one or more processor or controllers as described above via which pathway measurement system 10 is placed in the first mode or the second mode (for example, via a user interface such as touch screen display 160). One may, for example, relatively quickly collect data on surface roughness of a pathway by using mobility system 40 (for example, including wheels) to move sensor 60 along the pathway. Various lengths of the pathway may, for example, be determined (by pathway measurement system 10 and/or by the user) to require further or more accurate characterization. Pathway measurement system 10 may, for example, be positioned over such lengths or regions of the pathway and placed in the second mode. If, for example, the second mode provides for a two-foot translation in the position of sensor 60 relative to frame 40, a ten-foot length of the pathway may be characterized in the second mode by placing pathway measurement system 10 at five stationary positions along that length of the pathway.

The first mode, "rolling mode" or "running mode" (RM) allows, for example, a user or a motorized or robotic mechanism utilizing remote control, mobile devices and guidance systems such as a GPS guidance systems to push or propel the system continuously along a length of the pathway. Pathway measurement system 10 may include a speed sensor, encoder and/or speedometer to measure the speed at which pathway measurement system 10 is travelling in the first mode as well as an odometer. A display of the speed etc. may, for example, be provided on display 160. The first mode allows for a relatively large amount of data to be collected in a relatively short period of time. In a number of embodiments, while data is continuously collected, a user may be alerted of pathway segments that fall out of compliance with predetermined standards or are sufficiently rough (as, for example, compared to a predetermined threshold) to, for example, introduce errors to the continuous data collection. Data from such segments may need to be recollected using the second or "inchworm" mode (IM). When the pathway measurement system is stopped, each rough segment (identified as described above) may, for example, be displayed in a queue. The queue may, for example, display the distance the user must backtrack to recollect the data for each identified segment. The user may, for example, decide to either recollect the data, provide a verbal commentary using the methods described above (for example, SIRI, Dragon, etc.) or ignore the notification/error for a particular identified segment.

Figure 4A:
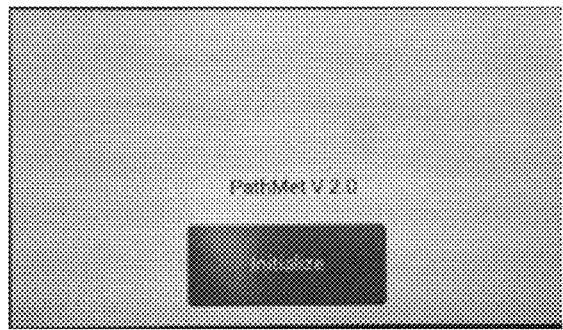
FIG. 4A illustrates a screen capture of an embodiment of an initialization screen of an embodiment of software for a methodology of measuring pathway characteristics.
Figure 4B:
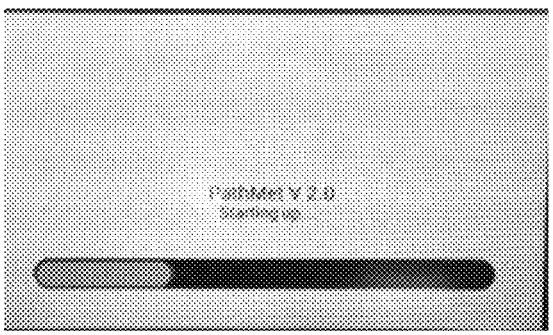
FIG. 4B illustrates a screen capture of an embodiment of a startup screen after initialization is activated.
Figure 4C:
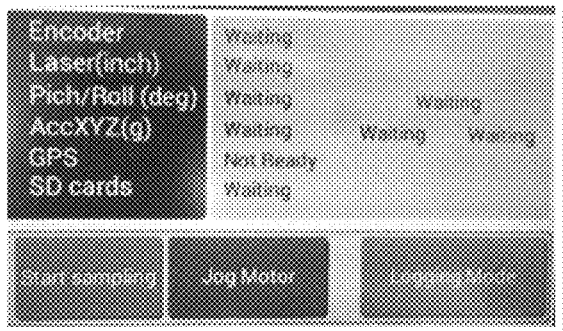
FIG. 4C illustrates a screen capture of an embodiment of a screen of the pathway measurement system after initialization and startup, wherein the system is awaiting a command.
Figure 4D:
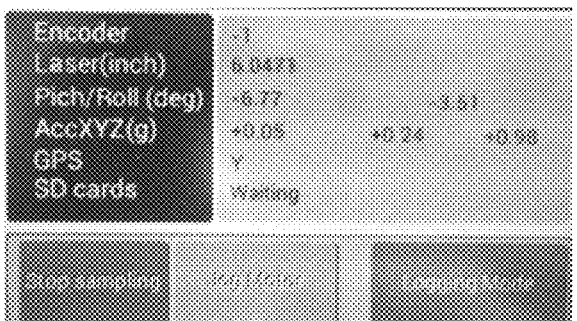
FIG. 4D illustrates a screen capture after a user activates a "Start sampling" touchscreen button to determine if all the sensors are sampling properly.
Figure 4E:
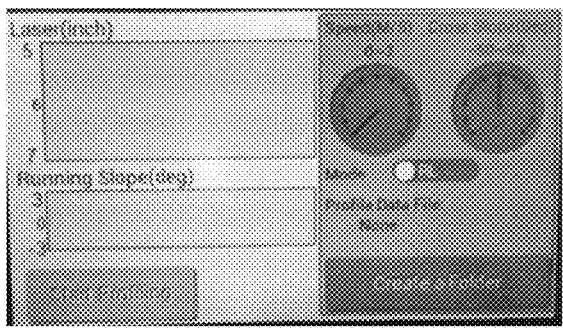
FIG. 4E illustrates a screen capture of an embodiment of a screen after sampling is stopped by a user, providing an option to create a folder/file for a pathway measurement data file.
Figure 4F:
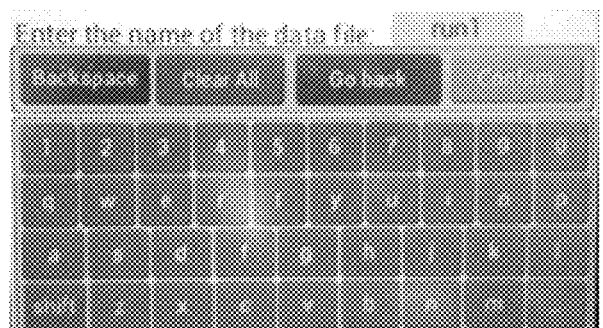
FIG. 4F illustrates a screen capture of an embodiment of a screen for entering the name of a data file.
Figure 4G:
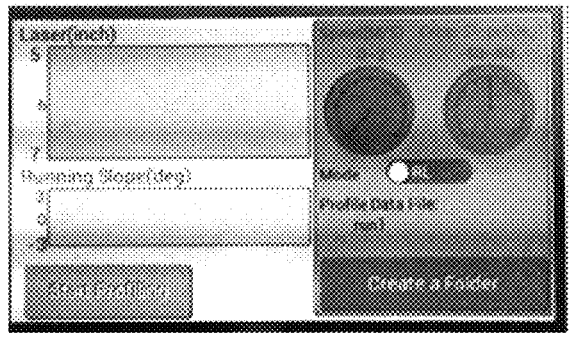
FIG. 4G illustrates a screen capture of an embodiment of a screen for choosing a mode of measurement and initiating profiling or characterization of a pathway.
Figure 4H:
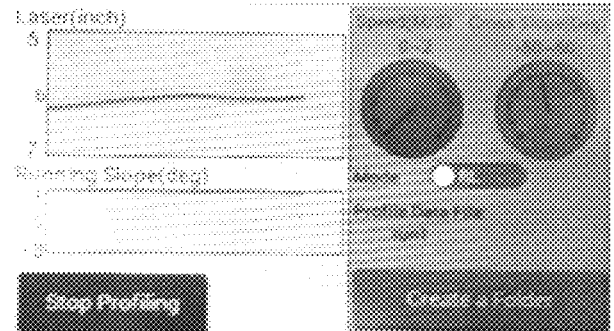
FIG. 4H illustrates a screen capture of an embodiment of a screen providing real-time data of various measurements during characterization of a pathway.
Figure 4I:
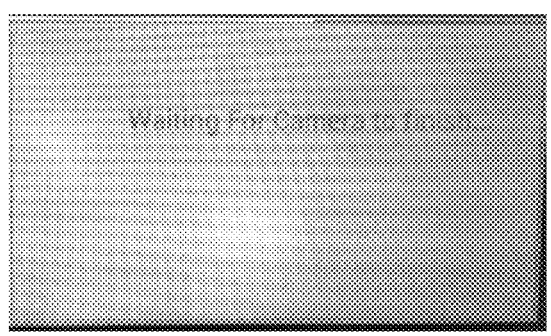
FIG. 4I illustrates a screen capture of an embodiment of a screen exhibited after profiling is stopped, indicating that the system is in the process of storing data such as camera data.
Figure 4J:
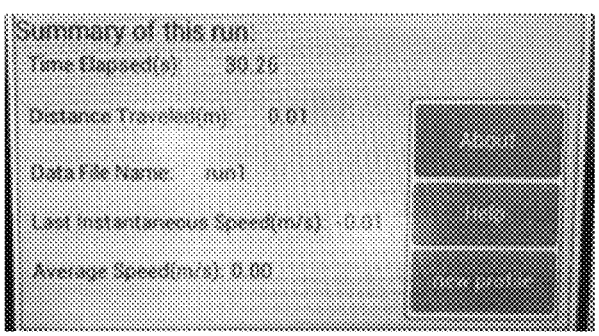
FIG. 4J illustrates a screen capture set forth after storage of data is complete and providing a summary of a number of aspects of the completed profile.

FIGS. 4A through 4J illustrated a number of screen captures from display 160 illustrating a representative embodiment of a methodology for data collection. FIG. 4A shows display 160 upon powering pathway measurement system 10. When ready, the user presses the "Initialize" (touchscreen) button to initialize pathway measurement system 10. FIG. 4B illustrates the loading bar after the initialize button is activated. In a number of embodiments, the loading screen takes a period of time (for example, approximately twenty seconds) to, for example, allow a laser of sensor 160 to warm up and initialize. FIG. 4C shows that pathway measurement system 10 awaiting a command. When ready, the user activates a "Start sampling" touchscreen button to determine if all the sensors are sampling properly. FIG. 4D shows pathway measurement system 10 in a "sampling mode". To proceed, the user first selects "Stop sampling," then "Logging Mode." At this point, the user is almost ready to begin logging data. The user may first create a folder and/or file in which to save data for that specific data collection run by selecting "Create a Folder" as illustrated in FIG. 4E. The user enters a file name using the touchscreen keypad illustrated in FIG. 4F and presses "Confirm." The user is now ready to begin data collection as illustrated in FIG. 4G. First, the user selects either Rolling Mode (RL) (shown in FIG. 4G) or Inchworm Mode (IW). When ready to begin data collection, the user presses "Start Profiling" and begins, for example, manually propelling pathway measurement system 10 (if in Rolling Mode). FIG. 4H illustrates the four real time outputs that are displayed on display 160: A) running slope, B) profile of the surface, C) speed, D) cross slope. As clear to those skilled in the art, additional and/or alternative outputs can be displayed. In a number of embodiments, if the user is manually propelling pathway measurement system 10 at an appropriate speed, an indication is provided to the user. For example, the speedometer on display 160 may turn green in color. If the speed is not appropriate, the speedometer may, for example, turn red. When the user wants to complete data collection, the user presses the "Stop Profiling" button (FIG. 4H). FIG. 4I shows that one or more sensors such as camera 124 must finish transferring data before proceeding to the next run. FIG. 4J illustrates a summary of the run, including time elapsed, distance travelled, file name, last instantaneous speed, and average speed. In the illustrated embodiment, the user can then select "new profile" to begin a new run, "About" to learn about the previous run, or "Help" for help in proceeding.

Figure 5:
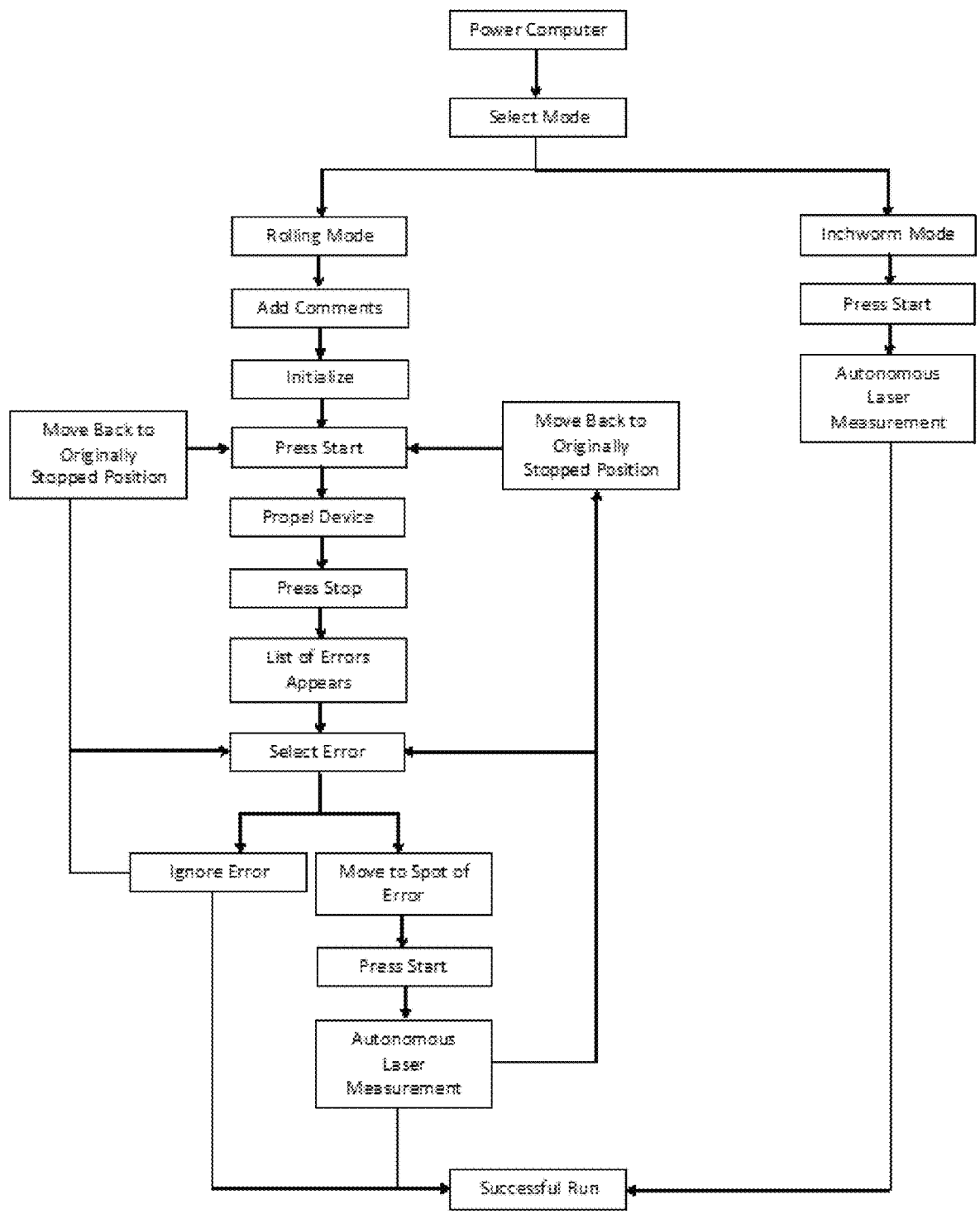
FIG. 5 illustrates a flow chart of an embodiment of a methodology for a first mode, running mode, or rolling mode of operation of a pathway measurement system hereof.

FIG. 5 shows an embodiment of a flow chart for operation within the first mode, running mode or rolling mode. If the user decides to recollect that data, the user may backtrack the original path travelled. As the user moves backwards, an odometer may, for example, count down until it reads "0 ft" for the first error listed. A location system such as a GPS or global positioning system (discussed further below) may also be used to appropriately position pathway measurement system 10. The errors may be ordered from newest to oldest in a queue. The user then stops motion of the pathway measurement system, applies a brake, and initiates the second mode. The user has the option to ignore the next error, measure the next flagged segment, or continue data collection as normal. This process may be repeated for each segment that displayed an error in the queue.

The pathway measurement system may, for example, further include a location system 170 (see FIG. 3) to determine the position (for example, an absolute position) of the pathway measurement system. The location system may, for example, include a GPS (global positioning system) location system or a system using cellular phone towers. GPS is a satellite-based navigation system that provides location and time information where there is an unobstructed line of sight to four or more GPS satellites. The GPS satellites continuously transmit data including their current time and position. A GPS receiver "listens" to multiple satellites and solves equations to determine the exact position of the receiver and its deviation from true time. At least four satellites must be in view of the receiver to compute four unknown quantities including three position coordinates and clock deviation from satellite time.

Data collected via the pathway measurement system may, for example, be made available on a cloud-based system as, for example, part of a database. For example, roughness indices and/or other data and/or pathway characteristics may be uploaded and overlaid upon a proprietary grid of nodes and segments, overlaid upon a map database such as available on GOOGLE® maps and/or uploaded to ProVAL (an engineering software application used to view and analyze pavement profiles, developed by The Transtec Group of Austin, Tex.) for user review and/or uploaded to ArcGIS (a mapping platform to create and share interactive maps available from Esri of Redlands, Calif.) for future analysis. At least one camera 124 (for example, a video and/or photo recording device) may also be included in the pathway measurement system 10 and video and/or photographs with GPS location tags may be recorded and/or uploaded to a database Pathway measurement system 10 may further include a communication system 172 (see FIG. 3) via which data, control function information etc. can be transmitted and/or received in a wired and/or wireless fashion. Communication system 172 may, for example, include a transceiver. In a number of embodiments, information may, for example, be transmitted and/or received via, infrared communications, cellular communications or wireless network communications protocol using a personal communication device such as a smartphone or tablet.

Camera 124 or sensor 60 (for example, in the form of a LIDAR sensor) may be used to evaluate dimensions (for example, pathway width). For example, a determination of dimension may be achieved by characterizing the focal length of the camera and then performing some image analysis. In one example, a camera is used to collect an image, which is characterized using a grid (for example, on a floor). In that regard, an image may be taken of a matrix with known spacing. Images taken during use of the system may then be overlaid on such a grid or other measurement structure, providing the ability to measure dimension of an item in the image (for example, pathway width). The same process can be used by either one or two cameras (i.e. stereoscopic vision).

In a number of embodiments, processor system 164 is adapted to determine a roughness index associated with a particular type of vehicle from data measured by at least one sensor such as sensor 60. The roughness index may, for example, be determined based upon a wheel diameter of the particular type of vehicle. An example of an algorithm for determining roughness and/or a pathway roughness index or PRI is set forth below:

Collect data and format data if necessary

Apply a moving average; for example, via a (low-pass) filter

Use the first data point as a starting point

Find the data point that is a predetermined wheel diameter away from the starting point and use it as an end point Make an arc with a radius that is half of the predetermined wheel diameter from the starting point to the end point Check to see if any data point y-values (generally vertical direction) are greater than the y-values created by the arc If any are, move the end point one data point closer to the start point and create an arc from the start point to the new end point and repeat checking Repeat moving the end point closer until no data point y-values are above the arc y-values or the end point becomes the adjacent point to the start point If no data point y-values are above the arc points, then append the wheelpath array with the arc points and make the new start point the end point of the arc If the end point becomes the adjacent point to the start point, append the end point the wheelpath array and make the end point the new start point Repeat making arcs from start points to end points and append the wheelpath array until the start point is within a predetermined wheel diameter from the end of the data.

Figure 6:
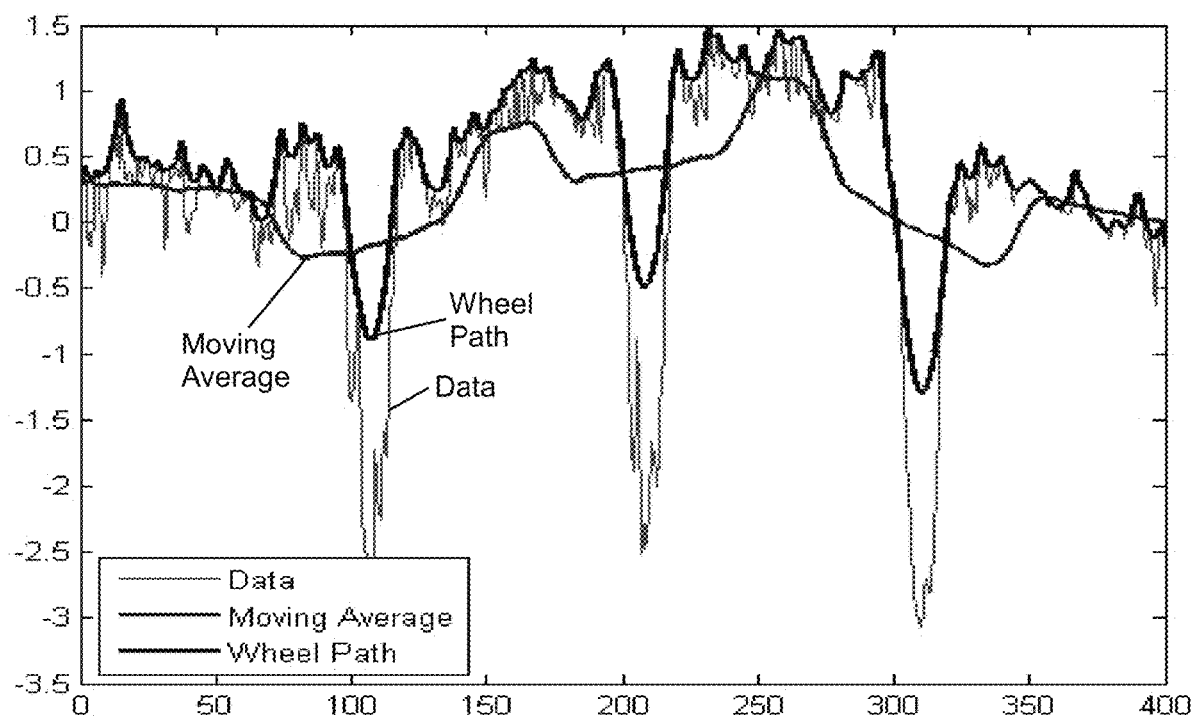
FIG. 6 illustrates an example of a measure data profile for a pathway characterization or pathway profiling setting forth the data from a laser-based sensor, a moving average of that data, and a determined wheel path of a wheel having a predetermined diameter.

Once that happens, use the last data point as the first end point for each new start point until the start point is the last data point To determine an overall Pathway Roughness Index take the wheelpath array and sum the absolute value of the vertical deviations from adjacent points and divide by the total length of the data An example of graph of raw distance data (between the at least one sensor and the surface of the pathway), a moving average and a wheelpath as determined above is set forth in FIG. 6.

A loop may be defined to, for example, determine if the PRI of a moving area/length (for example, 5 meter sections). One may, for example, use the loop to determine the location/position of local high-roughness areas.

In a number of embodiments, Pathway Roughness Index or PRI as described above is specific to the present tools, devices, systems and/or methods and is calculated as the sum of the vertical deviations normalized by the distance travelled. In a number of embodiments, the PRI was based on a computer-simulated path of a solid 2.5-inch wheel as it travels over a determined surface profile. As described above, data is stored and may, for example, be directly uploaded to a proprietary grid of nodes and segments, uploaded to Google Maps and/or uploaded to ProVAL for user review and future analysis. A 2.5-inch solid wheel was chosen for determining PRI in a number of embodiments because it is typically the worst case scenario for a manual wheelchair caster wheel. Unlike other roughness characterization algorithms, the algorithms hereof provide the ability to determine, for example, when a wheel will bridge a crack. In that regard, a wheel does not always hit the bottom of the crack when travelling over it. Therefore, in such cases, the extra displacement is not included in the index calculation in the present methodologies.

The results obtained with non-optimized embodiments of pathway measurement system 10 as, for example, illustrated in FIGS. 1 and 2 demonstrate the ability to measure pathway roughness with high detail and accuracy. Relatively fast sampling rates of sensor 60 using, for example, laser light energy and encoder sensor 100 allow pathway measurement system 10 to measure with a resolution of, for example, 1 mm. Various aspects of the mechanical design of pathway measurement system 10 also facilitate accurate data collection. For example, 22-inch. non-pneumatic solid foam-filled tires allow pathway measurement tool 10 to roll over large cracks without being affected by crack characteristics. Mechanical design features which reduce the amount of errors in the system provide for a reduction in the number of or complexity of filters in associated software code.

Furthermore, pathway measurement system 10 was found to be user-friendly in both electronic and mechanical design. Touchscreen display 160 allows the user to simply touch the display to interact with pathway measurement system 10. In addition, the operating software provides a method for planning a data collection effort through a simple visual interface, identifying the target areas, indicating the data collected against such target areas in real time, and displaying a graph of the profile of the surface during data collection, which allows the user to see if there are any excessively rough patches in a pathway under analysis. Such software tools allow the operator at a particular location and at any point in the data collection effort to evaluate the success of the data collection and allow the user to measure the surface again to ensure accuracy (for example, using the second mode or inchworm mode). In addition, the rolling design improves usability by the ease with which data is collected. The user can collect data in a timely fashion; with an average propulsion speed of, for example, 1 m/s, the user can measure a mile of surfaces in less than 27 minutes. After data collection, the user can easily transport pathway measurement system 10 by removing wheels 42 and 46 and collapsing the telescoping handle support 24.

Pathway measurement system 10 measured running slope and cross slope. Filtering techniques known to those skilled in the software arts were implemented to improve the accuracy of the results. Such filtering can be reduced or simplified via further optimization. Measurement of roughness and level change was achieved with significant consistency. Results from the intra- and inter-class correlation analysis showed that (with a correlation of 0.993 and 0.983, respectively, and a Cronbach's alpha of 0.993) the use of pathway measuring system 10 is highly reliable. Furthermore, an intra-class correlation of single measures value of 0.979 is of significance, especially because pathway measurement system 10 will probably only be used by one person at a time to measure a pathway surface. Intra-class correlation results in both single measures and average measures showed a significance of $p<0.001$.

Thresholds for surface roughness may, for example, be established. For example, pathways greater than 30 m in length may be suggested to have a PRI value of less than 50 mm/m (0.6 in/ft). Pathways that are less than 3 m in length may, for example, be suggested to have a PRI value of less than 100 mm/m (1.2 in/ft). To evaluate all lengths of pathways, a moving window of a predetermined length such as 3 m and 30 m may, for example, be used to determine if any 3 m or 30 m section of a pathway is above these thresholds. Other moving window lengths and PRI thresholds may, for example, be used.

In the embodiments discussed above, changes in elevation of a pathway surface are measured directly by, for example, the measurement of light reflected from sensor 60. In a number of other embodiments of pathway measurement systems hereof, a sensor such as an accelerometer may, for example, be used to indirectly measure or estimate a roughness index such as the PRI described above. Such an estimate may, for example, provide a first approximation. A pathway measurement system including, for example, an accelerometer to provide an estimate of a roughness index may also include a sensor to directly measure changes in surface elevation such as a laser-based sensor as described above. In areas of concern or question (as identified by characterization with the accelerometer) the laser-based sensor can be used in a rolling mode and/or an inchworm mode as described above to further characterize the surface. Alternatively, a first pathway measurement system (or a plurality of) (or a plurality of pathway measurement systems) may include a sensor for indirectly measuring or estimating a roughness index, and a second or another pathway measurement system may include a sensor to directly measure changes in surface elevation such as a laser-based sensor as described above. In areas of concern or question as determined by one or more of the first pathway measurement systems, the second pathway measurement system may be used to further characterize the surface.

In the case of a number of sensors which are sensitive to the effect of changes in pathway elevation to frame movement (such as vibration), an automated and/or passive approach may be used to collect data (such as vibration data) from vehicles having an alternative use (that is, a use or normal use that is other than pathway characterization) such as personal mobility devices, mail carts, police carts, strollers, bicycle etc. which typically travel a pathway, and to estimate or predict if the pathway surfaces that are being traveled are above or below a certain threshold such as the PRI described above. In a number of studies, a Support Vector Machine or SVM learning approach was applied to the vibration and wheelchair characteristic data collected in the earlier study. In the machine learning arts, support vector machines or support vector networks are supervised learning models having associated learning algorithms that analyze data and recognize patterns, used for classification and regression analysis. Results from such studies demonstrated, for example, that it is possible for wheelchair users to passively collect data with, for example, an accelerometer (such as included in the Inertial Measurement Units or IMUs in smartphones), which will predict whether the traveled surfaces are compliant or non-compliant with the proposed roughness thresholds. Using a device specifically developed or designed to measure pathway roughness may, for example, be used for some marginal surfaces or portions of such surfaces. However, using crowdsourced data and, for example, a Support Vector Machine or other machine learning approach to compare and grade multiple, overlapping, data sets may, for example, be used to eliminate at least some surfaces from the requirement of using a dedicated pathway measurement system such as pathway measurement system 10 thereof. Preliminary, non-optimized results indicate that at least the roughest and smoothest surfaces may, for example, be identified and eliminated from the surfaces that would need to be characterized using a dedicated pathway measurement system. Such an approach may, for example, provide a quick and/or easy way for cities, municipalities, and property managers to inventory their sidewalk and/or other pathway systems to identify surfaces in need of repair or replacement.

In a number of studies, a Support Vector Machine learning analysis was conducted on previously collected vibration data that was obtained from wireless accelerometers attached to wheelchair frames as they were driven over various surfaces. The results demonstrated that using only average RMS acceleration data, 75% of the surfaces could be accurately grouped as compliant or non-compliant within proposed roughness thresholds.

A potential variation to increase the usefulness of, for example, vibration data is the use a different or multiple cutoff points. Such an approach is analogous to maximizing sensitivity or specificity for diagnostic tools. If the cutoff point for the SVM was changed to, for example, 70 mm/m, then any surface that was classified as above that threshold would very likely actually be above the actual cutoff point of 50 mm/m. That approach may, for example, be used if a city, municipality, or property manager wanted to identify only the worst surfaces, but was not as concerned with surfaces that were marginally rough. Alternatively, if a city, municipality, or property manager wanted to inventory their sidewalks and/or other pathways but wanted to save some time by identifying and then bypassing the best surfaces during their evaluation efforts, a cutoff point around 30 mm/m could be used. To save the most amount of time and cost, both approaches could be used wherein the best surfaces and worst surfaces as determined, for example, by crowdsourcing could be eliminated, and only the surfaces of marginal or intermediate roughness would be objectively measured by a more reliable instrument.

As smartphone technologies have evolved and included more sensors, they have become useful tools for data collection. Many smartphones now, for example, include Inertial Measurement Units and GPS which can record vibration data, location, running slope, cross slope, and potentially speed. By rigidly or fixedly attaching a smartphone to, for example, a wheelchair frame (isolated from any suspension system) and running a data collection application, a wheelchair user may passively collect data about the surfaces that they travel over in the context of their normal everyday routine. This data could then be uploaded to a database and filtered using an SVM as described herein. If many people in a city use this app, an inventory of the sidewalk network starts to appear along with data on the accessibility of the surfaces. As multiple people travel over the same surfaces, the accuracy and predictability of the SVM increases.

There are many uses of this data. For example, cities, municipalities, and property managers can take a proactive rather than reactive approach to repairing sidewalks by having a plan in place to repair inaccessible sidewalks before there are incidents or complaints. Further, this data can be used in conjunction with a way-finding software for people with disabilities. A wheelchair user may, for example, specify certain aspects of the surfaces that the user wants to avoid. For example, a user may choose to avoid surfaces with a roughness above 100 mm/m.

As described above, the SVM learning approach hereof may be useful to identify accessibility characteristics other than roughness such as cross slope, running slope and level changes. To identify level changes, peak accelerations could be used as opposed to the average RMS accelerations that were used in a number of studies discussed below. Peak acceleration threshold may, for example, be used to predict how large of a bump was encountered, thereby identifying a potential tripping hazard.

SVM quality may improve when you include variables regarding characteristics of the personal mobility device and user, and a calibration step may also help improvements. In some cases, it may thus be desirable to include characteristics about the mobility device and user (e.g. manual vs. power wheelchair, wheelchair vs scooter, robotically propelled system, etc.) to impact the predictive ability of the SVM. A calibration step, wherein, for example, after the smartphone is docked to the mobility device, the mobility device is maneuvered over known obstacles of different height, may, for example, be used to improve the predictive ability of the SVM, creating a SVM 'tailored' to a particular user or style of mobility device.

WORKING EXAMPLES

Reliability Testing.

The embodiment of pathway measurement tool 10 illustrated in FIGS. 1 and 2 was tested for intra- and inter-rater reliability as well as surface level change characterization. To test for inter- and intra-rater reliability, three individuals propelled pathway measurement tool 10 over three different surfaces. The first surface was a 16×4 foot engineered surface made from poplar hardwood. The first surface included two rows of 48 pieces of 8-inch wide poplar. The 48 pieces were arranged so that there was a 1.25-inch gap between each board. The second and third surfaces were a typical concrete surface and a stamped brick surface, respectively. For each surface, the user propelled pathway measurement tool 10 along three different paths.

Table 1 shows the results of the testing protocol for intra- and inter-rater reliability. Each cell represents the average PRI for a particular user on a particular surface. The standard deviation within the trials is also displayed. The engineered surface showed the largest variance in standard deviation between users. After performing IBM SPSS Statistics analysis for intraclass correlation, the results show a 0.993 intraclass correlation of average measures with a 95% confidence interval of [0.976, 0.998]. Similar analysis shows a 0.979 intraclass correlation of single measures with a 95% confidence interval of [0.932, 0.995]. In addition, an inter-item correlation results in a 0.983 mean with 0.976 and 0.997 minimum and maximum values, respectively. Finally, SPSS analysis presents a Cronbach's alpha equal to 0.993.

TABLE 1

|  | User 1 Average (Std Dev) | User 2 Average (Std Dev) | User 3 Average (Std Dev) |
|---|---|---|---|
| Engineered | 0.92 (0.01) | 0.99 (0.13) | 0.94 (0.06) |
| Concrete | 0.39 (0.02) | 0.39 (0.02) | 0.40 (0.04) |
| Stamped Brick | 0.47 (0.05) | 0.46 (0.03) | 0.44 (0.04) |

Surface Level Change Testing.

Surface level change characterization studies included one user manually propelling pathway measurement system 10 three times both up and down four different sized steps, ¼", ½", ¾", and 1". The setup included 2×4 foot sheets of ¼-inch thick MDF wood placed over top of collapsed tabletops to provide a solid level surface. Testing also occurred to observe the effects of laser (sensor 60) placement or position on pathway measurement system 10 on the surface profiles. During the testing, sensor 60 was placed in three different locations or positions on pathway measurement system 10, including behind rear axle 44, under rear axle 44, and in front of rear axle 44.

Figure 7:
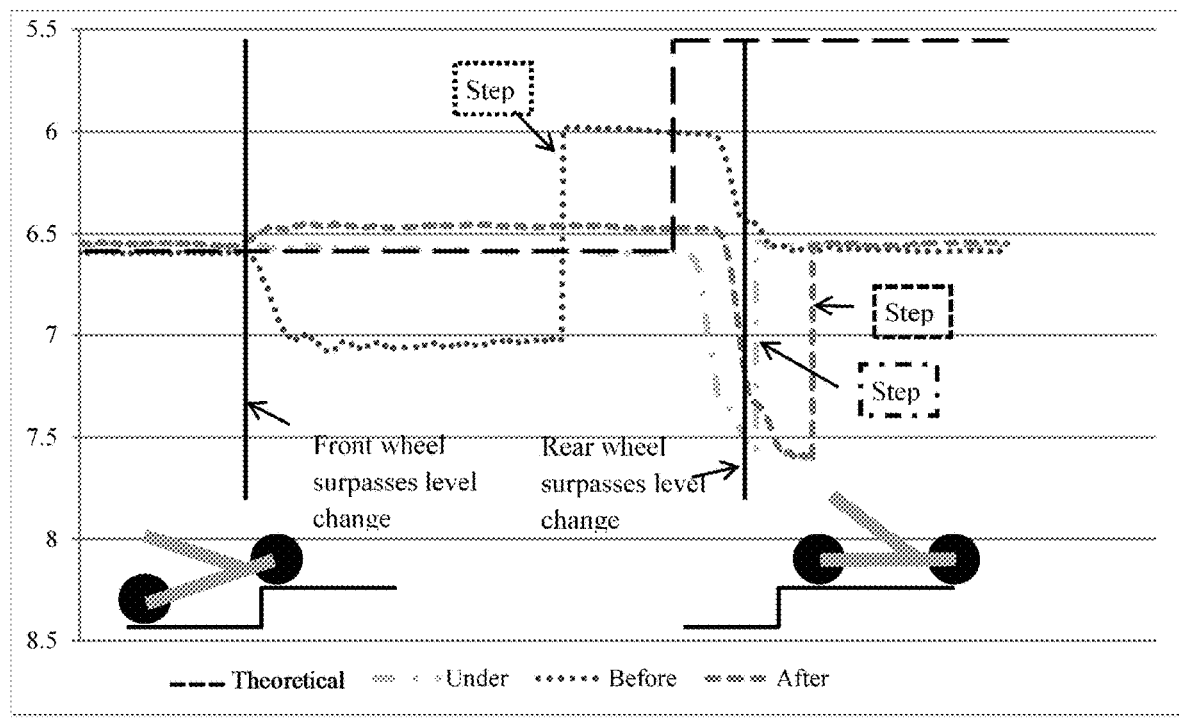
FIG. 7 illustrates the results of a study of measurement of a step change in elevation or level of a surface for various positions of a sensor on the pathway measurement system.

Level change testing results are illustrated in FIG. 7. FIG. 7 also illustrates the effects of different position of sensor 60 when propelling over a one inch step. The line labeled Theoretical is the actual profile of the step. The lines labeled After, Under, and Before show profiles of the step change in surface level when sensor 60 is placed behind rear axle 44, under rear axle 44, and in front of rear axle 44, respectively.

It can be seen from the After line or profile that when the front wheel hits the step, sensor 60 moves closer to the ground giving the illusion that there is a small bump. Then, rear wheel 42 hits the step raising sensor 60 one inch higher than its original position. The After profile thus appears as if pathway measurement system 10 has traveled over a crack in the surface. However, sensor 60 has not experienced the step until the final vertical line in the After profile when the distance/height measurement of sensor 60 returns to its original height.

The line or profile labeled Under shows results similar to the After profile when the wheels hit the step and the effects that has on the data from sensor 60. On the other hand, when sensor 60 is placed in front of rear axle 44, data is presented in the Before profile in a way where the one inch step is clear. In addition, in the Before profile there are two half-inch steps, one before and after the step, that represent the times the front wheel and rear wheel ascends the step.

The above results indicate that placement of the sensor 60 may significantly affect the measured profile data. Excess vibrations and errors in measurement may, for example, a greater roughness than what is expected. In the tested embodiments, a certain amount of error is experienced when front wheel 46 contacts a step or step change. The same occurs when rear wheels 42 contact the step. In the tested embodiments of pathway measurement system 10, placing sensor 60 to the rear of rear axle 44 appeared to be the least desirable position for sensor 60 since it is the most difficult to determine from the resultant profile when sensor 60 actually moved up the step. On the other hand, it was the easiest to determine from the resultant profile where the step occurred when sensor 60 was placed in front of rear axle 44. It was concluded that more testing was required to investigate the effects of positioning sensor 60 directly under rear axle 44. The results for placement of sensor 60 under rear axle 44 were similar to the results when sensor 60 was placed to the rear of rear axle 44. However, such results may be associated with imperfect alignment under rear axle 44. Moreover, the results may be affected by rear wheels 42 contacting the step before sensor 60 passes over the step. It may be beneficial to test how the sensor 60 reacts when placed at a point where rear wheels 42 first contact a step. Regardless of the laser placement, algorithms may be developed to translate measurements from sensors 60 and 100 (as well as other sensors in a number of embodiments) into accurate profiles of the surface. Nonetheless, the choice of placement of sensor 60 via known engineering principles as described herein can simplify coding and potentially increase accuracy.

In a number of embodiments, the laser data were filtered using a 3-point moving average filter to minimize the deviations caused by the noise of the laser. A moving average filter may be with time series data to smooth out short-term fluctuations and highlight longer-term trends or cycles. Moreover, to filter or account for changes in distance/height measurements arising from the passage of wheels 42 and 46 over elevation changes in the surface, data from one or more other sensors (for example, one or more inclinometers or accelerometers) and Kalman filtering was used. As known in the art, a Kalman filter uses the dynamics model of a system (e.g., physical laws of motion), known control inputs to that system, and multiple sequential measurements from sensors to form an estimate of the system's varying quantities that is more accurate than an estimate obtained using any one sensor/measurement.

Pathway Characterization and PRI.

Pathway measurement system 10 collected data from various different pedestrian pathway surfaces in Boston, Mass., and the results for a number of locations are set forth in FIG. 8. During testing, pathway measurement tool 10 was covered to keep mechanical aspects, operational aspects, and sensor systems thereof from view. Pathway measurement tool 10 was manually propelled, collecting various characteristics of the surfaces, including roughness, level change, GPS location, and picture. Data collection occurred near City Hall, First Church of Christian Science, Northeastern University, Stoneholm Street, Cambridge Street, Bowdoin Street, and Huntington Avenue.

Figure 9:
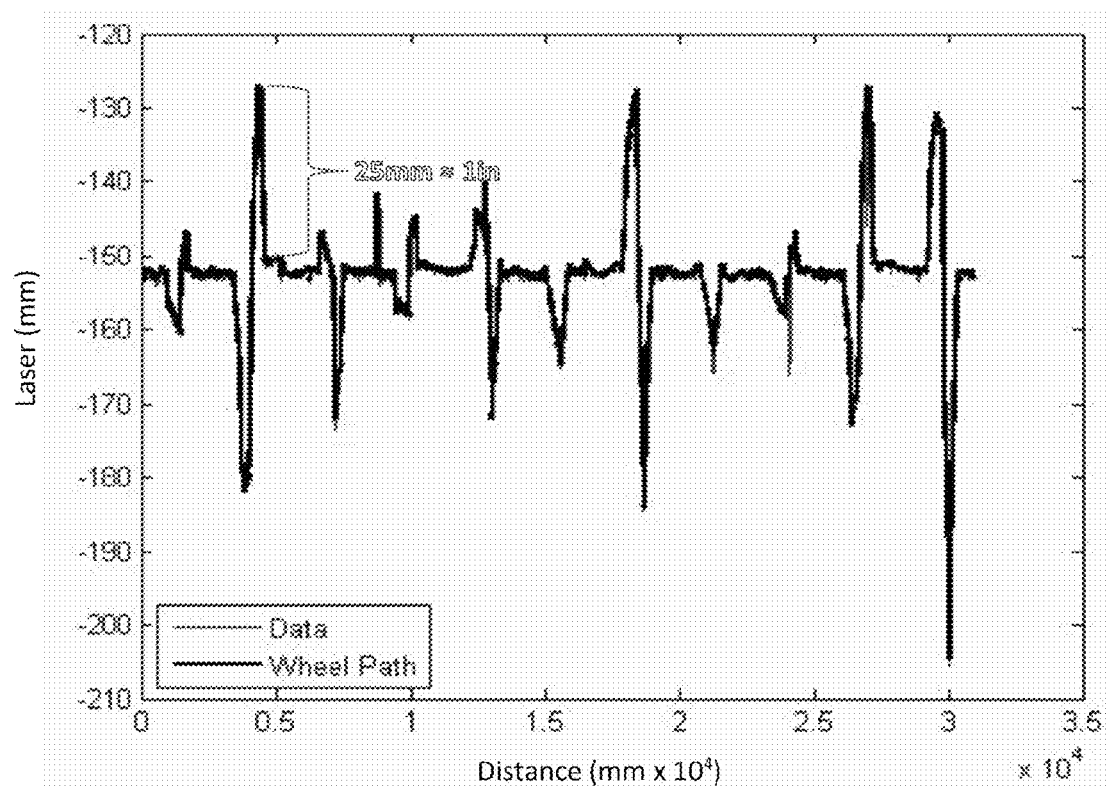
FIG. 9 illustrates a measured pathway profile for a portion of the pathway of surface 3 of FIG. 8.

Once again, FIG. 8 shows a table of a number of the locations where data was collected. The location, image, and pathway roughness index (PRI) of the surfaces are listed. A profile of portion of Surface 3 is shown in FIG. 9. According to the current threshold for roughness proposed to the Access Board, PRI should not exceed 0.6 in/ft for longer distances of 100 feet or greater. In a number of embodiment, acceptable surfaces may be indicated by highlighting in green (PRI less than 0.6 in/ft in the illustrated embodiment), cautioned surfaces may be indicated by highlighting in yellow (a PRI greater than or equal to 0.6 in/ft but less than 0.8 in/ft in the illustrated embodiments), and unacceptable surfaces may be indicated by highlighting in red (PRI greater than or equal to 0.8 in/ft in the illustrated embodiments) in FIG. 8.

Figure 10:
FIG. 10 show results of various pathway profiles overlain on an aerial or satellite photograph of an area of a city including those pathways.
Figure 11:
FIG. 11 show further results of various pathway profiles overlain on an aerial or satellite photograph of an area of a city including those pathways.
Figure 12:
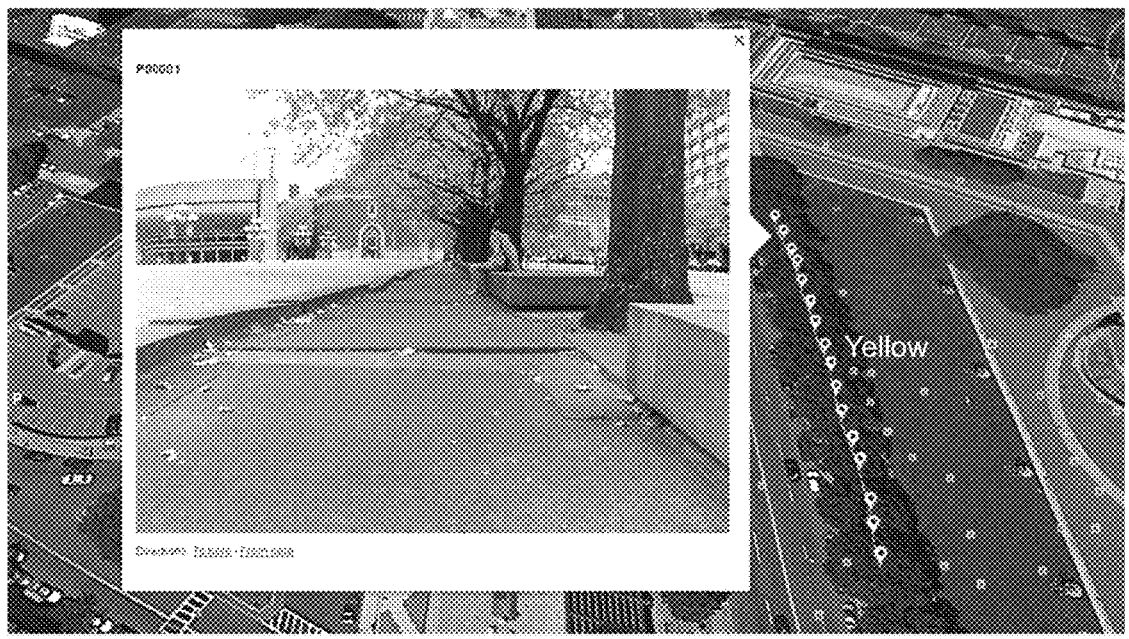
FIG. 12 shows results a pathway profile overlain on an aerial or satellite photograph of an area of a city including those pathways and an insert of a street level or ground level photograph of the pathway.

FIGS. 10 and 11 illustrate GOOGLE® Earth mapping of the surfaces with the same color coordination use for lollipop-shaped markers on the map along the pathway as discussed in connection with FIG. 8. Each placemark may, for example, have a picture linked with it that shows the specific area of the pathway (see FIG. 12).

Figure 13:
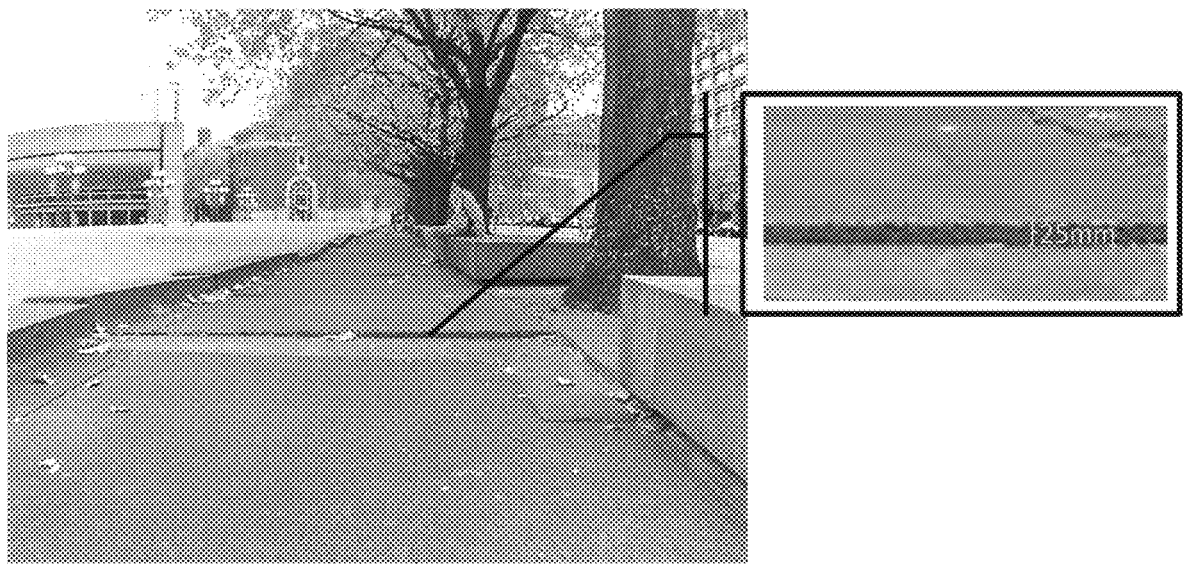
FIG. 13 illustrates a photograph of a portion of pathway surface 3 of FIG. 8 and an enlarged view of a portion of that surface in which a step change in elevation occurs.

Data collection on Surface 3 resulted in a PRI of 0.746 in/ft, averaged from five different runs over the surface. Although the PRI is in the cautioned range, FIG. 9 shows a spike of approximately 25 mm or one inch deep at four points. This change in level is not acceptable according to the Americans with Disabilities Act Accessibility Guidelines (ADAAG). According to ADAAG, a change in level cannot exceed ¼-in, or ½-in with bevel. The 1-inch change in level means that the surface does not comply with ADAAG. FIG. 13 shows the spot where the first noncompliance occurred. The picture matches the first 1-inch spike upward in FIG. 9.

A surface which was made of pavers (not shown in FIG. 8) had a PRI of 0.368, which is lower that the PRI of 0.546 of Surface 1, which was made of laid concrete. This result shows that a paver surface, when the pavers are laid and maintained properly, can be smoother than a concrete surface. This result is contrary to what is normally observed. For example, another surface which was formed of pavers (not shown in FIG. 8) had a PRI of 0.995, which is almost twice as rough as Surface 1 in FIG. 8.

Another noteworthy comparison is made between Surface 2 of FIG. 8 and another pathway surface on the opposite side of the street and including generally the same paver material. However, pathway surface across the street from Surface 2 also included concrete slabs mixed in with the pavers. The addition of a second type of material, although relatively smooth concrete, was found to be rougher (having a PRI of 0.771) than Surface 2 which included only pavers (having a PRI of 0.661). These results demonstrate the importance of ensuring smooth transitions between two dissimilar surfaces.

Figure 14:
FIG. 14 illustrates a photograph of a portion of another pathway characterized or profiled by a pathway measurement system hereof.
Figure 15A:
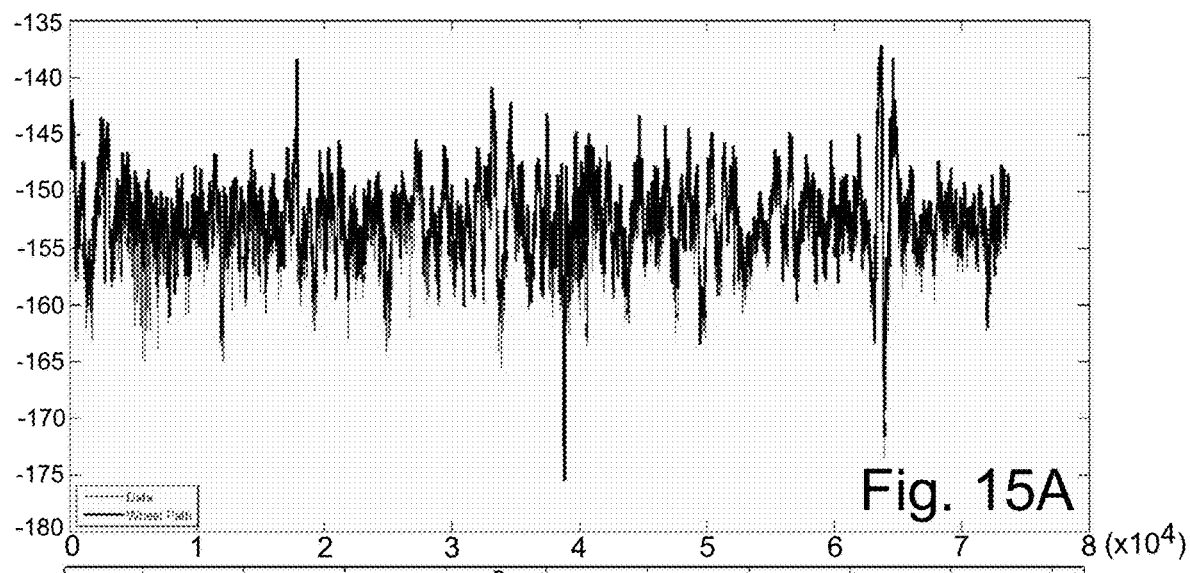
FIG. 15A illustrates a graph of data of a profile of the surface of FIG. 14 and the determined wheel path there over for a wheel of a predetermined diameter.
Figure 15B:
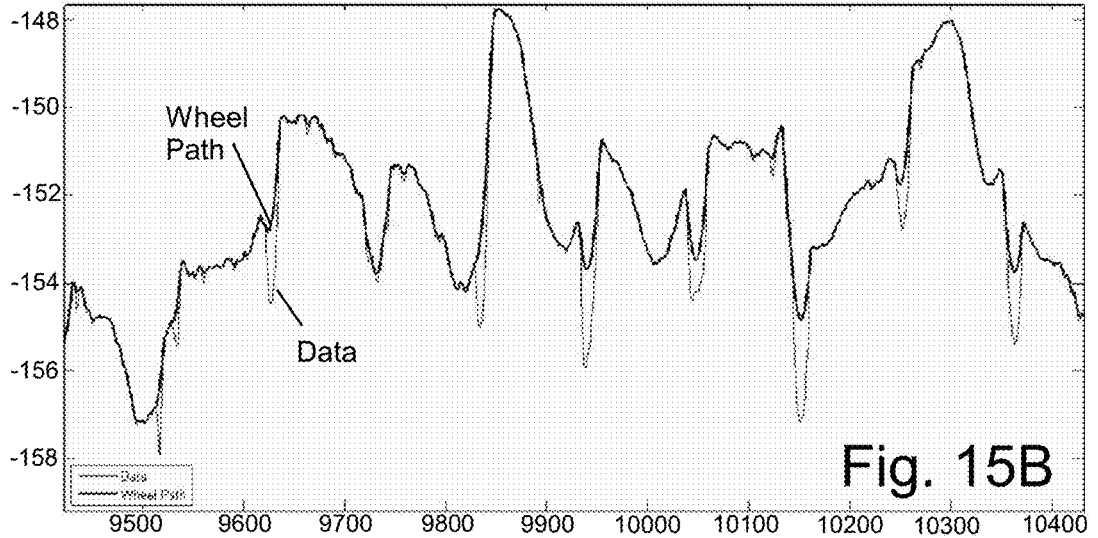
FIG. 15B illustrates an enlarged section of the graph of FIG. 15A.
Figure 15C:
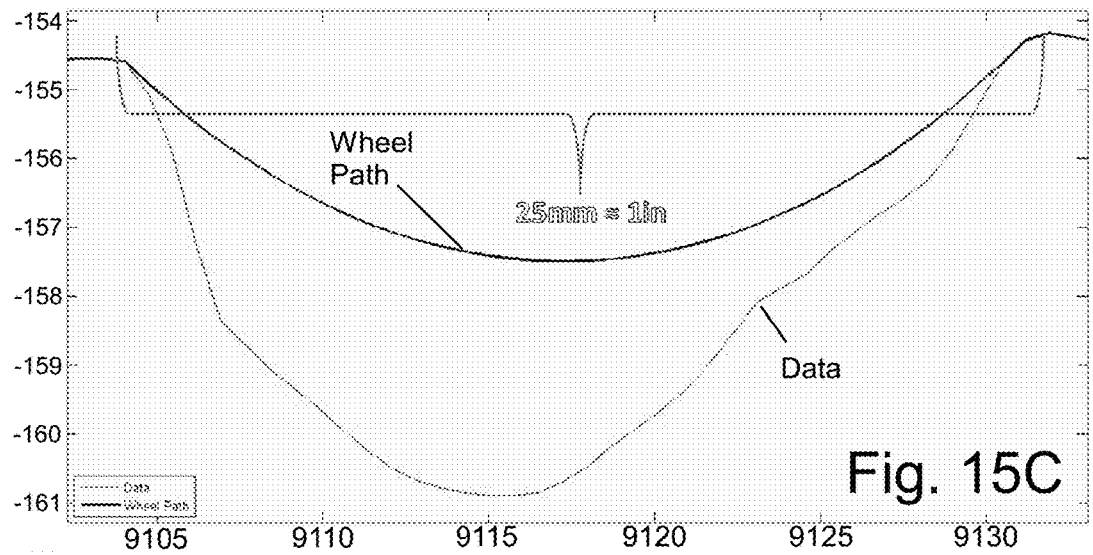
FIG. 15C illustrates a further enlarged section of the graph of FIG. 15A and sets forth the size of one of a 25 mm or 1 inch gap between the pavers of the surface of FIG. 14.

FIG. 14 illustrates an enlarged photograph of a paver surface on Stoneholm Street for which a PRI of 0.981 was calculated. The image of FIG. 14 shows large gaps in between pavers. FIG. 15A illustrates data from sensor 60 of a profile of the surface and the determined wheel path thereof. FIG. 15B illustrates an enlarged section of the graph of FIG. 15A. The periodic gaps between pavers can be seen in FIG. 15B. Upon further enlargement, FIG. 15C illustrates the size of one of a 25 mm or 1 inch gap between the pavers. The calculated PRI of the pathway surface was 0.981. It appears that the relatively large gaps between the pavers are a major contribution to the roughness for this surface.

Although the use of pathway measurement tools, devices, systems and/or methodologies hereof has been discussed primarily in connection with wheelchair usage, one skilled in the art will appreciate that the pathway measurement tools, devices, systems and/or methodologies hereof are useful for the characterization of pathways used for any purpose including, for example, walking by pedestrians and travel by any type of vehicle.

Passive Data Collection from Personal Mobility Devices.

In a number of studies, an automated and passive approach was used to collect vibration data from personal mobility devices such as wheelchairs. The data was processed/analyzed to predict if the surfaces that were being traveled were above or below pre-established PRI thresholds. An SVM learning approach was applied to the vibration and wheelchair characteristic data collected. The surfaces being evaluated were dichotomously separated based on whether the PRI values thereof were above or below 50 mm/m. Of the 55 total subjects, the first 15 were used as a training group for the SVM and the other 40 were used to evaluate the model. Because various manual and power wheelchairs with different characteristics were used, several characteristics of the wheelchair were included in the SVM (see Table 2 below). To evaluate if it is necessary to include such characteristics, the SVM was conducted 3 times; once using all seven variables listed in Table 2, once using only the Average RMS Acceleration values, and once using the Average RMS Acceleration values, the type of wheelchair, and the diameter of the castor wheels of the wheelchair.

TABLE 2

| Characteristic | Variable Type | Number |
| --- | --- | --- |
| Wheelchair Type | Categorical: Manual or Power | 27 Manual; 28 Power |
| Caster wheel size | Continuous | Range: 2.25-8.5 in |
| Drive wheel size | Continuous | Range: 12-27 in |
| Folding Frame | Categorical: Yes or No | 13 Yes; 42 No |
| Suspension in Frame | Categorical: Yes or No | 22 Yes; 33 No |
| Suspension in Castors | Categorical: Yes or No | 26 Yes; 29 No |
| Average RMS Accelerations | Continuous | Range: 0.187 to 11.863 m/s$^2$ |

Figure 16:
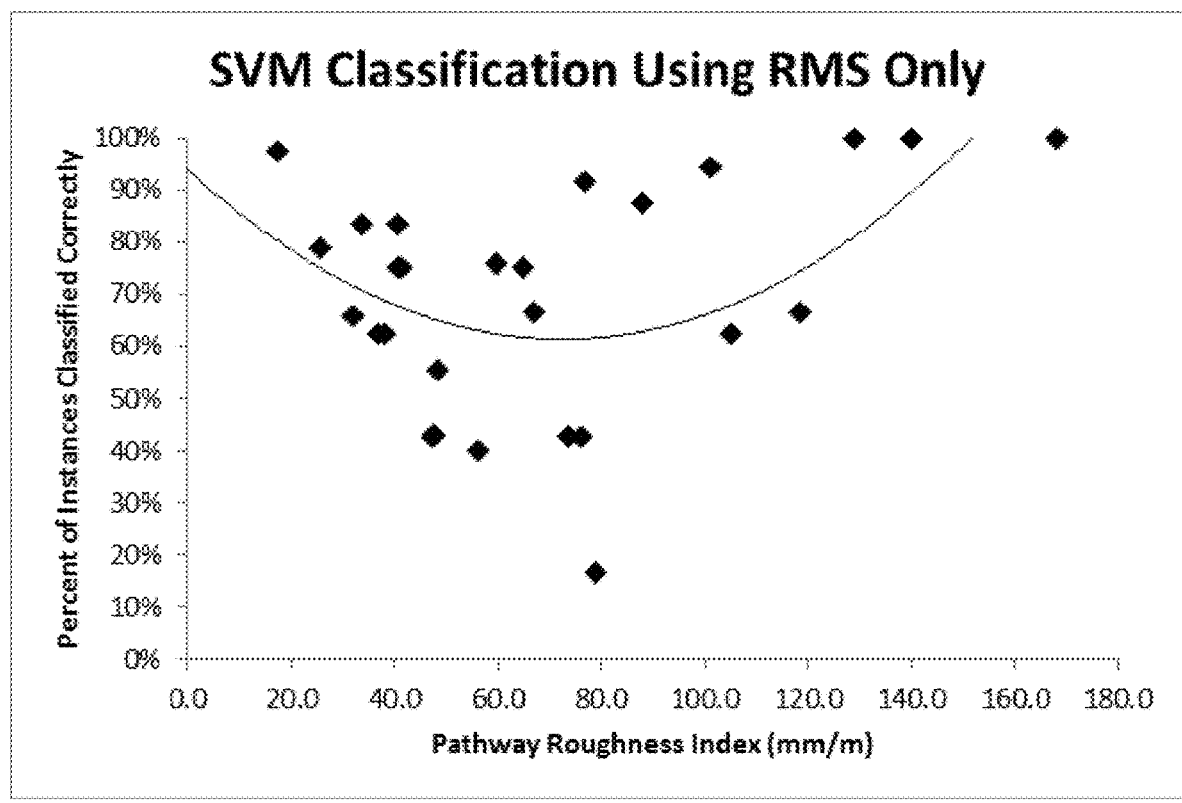
FIG. 16 illustrates a graph of a $2^{nd}$ degree polynomial line for roughness classification of pathway surfaces determined from data from a plurality of wheelchairs equipped with a sensor to detect a variable related to pathway roughness such as vibration.

The first 15 subjects with a total of 193 data sets were used as the training set. The other 40 subject with a total of 457 data sets were used to evaluate the SVMs. The accuracy results of the three SVMs are shown in Table 3 separated by the 27 different surfaces used. A graphical representation of the RMS Acceleration Only SVM is shown in FIG. 16.

Figure 3:
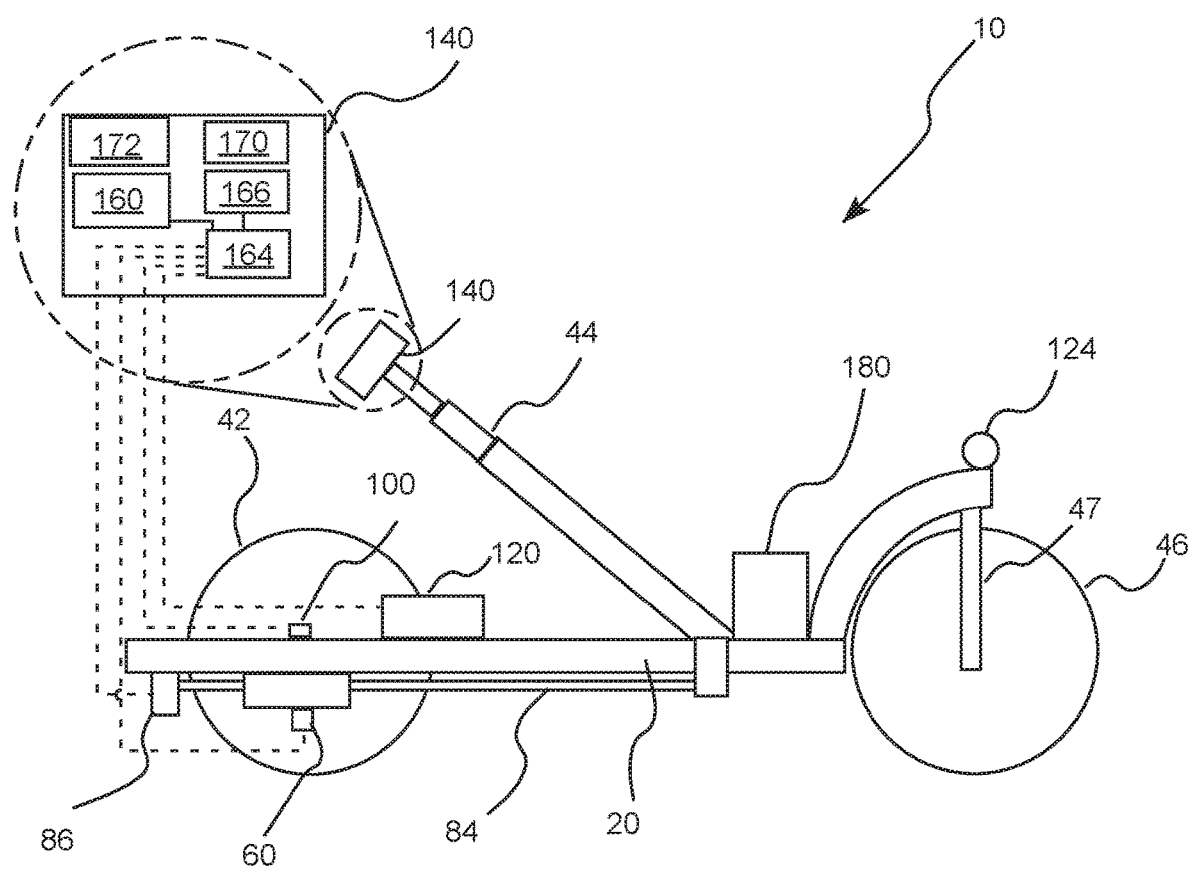
FIG. 3 illustrates a side schematic view of an embodiment of a pathway measurement system hereof.

The results in Table 3 show that using only the Average RMS Acceleration data resulted in an accuracy of approximately 75%. When some or all of the six characteristics of the wheelchairs are included the overall accuracy of the SVM rose only a few percentage points. The trend line shown in FIG. 3 is a $2^{nd}$ degree polynomial line demonstrating that the smoothest and roughest surfaces are the best classified in the SVM methodology, while the surfaces in the middle of the roughness spectrum are the most difficult for the SVM methodology to correctly classify.

TABLE 3

Percent Classified Correctly for Each SVM

| Surface PRI (mm/m) | Number of Subjects in Evaluation Group | All Variables SVM | RMS Accelerations Only SVM | RMS Accelerations, WC Type, Castor Wheel Diameter SVM |
|---|---|---|---|---|
| 17.1 | 39 | 95% | 97% | 97% |
| 25.8 | 38 | 79% | 79% | 82% |
| 31.9 | 38 | 68% | 66% | 76% |
| 33.8 | 6 | 83% | 83% | 100% |
| 36.8 | 8 | 75% | 63% | 63% |
| 38.1 | 8 | 50% | 63% | 50% |
| 40.4 | 8 | 88% | 75% | 88% |
| 40.5 | 6 | 83% | 83% | 83% |
| 41.2 | 8 | 88% | 75% | 88% |
| 47.1 | 7 | 57% | 43% | 43% |
| 47.7 | 37 | 38% | 43% | 41% |
| 48.2 | 36 | 58% | 56% | 67% |
| 56.1 | 5 | 60% | 40% | 60% |
| 59.8 | 37 | 76% | 76% | 81% |
| 64.8 | 8 | 75% | 75% | 75% |
| 67.0 | 6 | 83% | 67% | 83% |
| 73.8 | 7 | 57% | 43% | 57% |
| 76.2 | 7 | 29% | 43% | 29% |
| 76.8 | 36 | 94% | 92% | 94% |
| 78.9 | 6 | 50% | 17% | 50% |
| 87.8 | 8 | 88% | 88% | 88% |
| 101.1 | 36 | 92% | 94% | 92% |
| 105.0 | 8 | 75% | 63% | 75% |
| 118.4 | 6 | 100% | 67% | 100% |
| 128.8 | 35 | 97% | 100% | 100% |
| 140.0 | 7 | 100% | 100% | 100% |
| 168.1 | 6 | 100% | 100% | 100% |
| Total | 457 | 76.6% | 74.8% | 79% |

The number of subjects that traveled over each surface can affect the percentage of surfaces that are classified correctly. As seen in Table 3, five of the six surfaces that were classified correctly less than 50 percent of the time had seven or fewer subjects traveling over them. Such percentages may be improved with more subjects traveling on these surfaces. The overall correct percentage will also be affected based on how close the PRI values of the surfaces are to the cutoff point. The six surfaces that were classified correctly less than 50 percent of the time all had a PRI value between 40 and 80 mm/m. This again shows that the smoothest and roughest surfaces are classified correctly more than the surfaces closer to the cutoff point. If the PRI values of all surfaces happened to be below 40 mm/m or above 80 mm/m, the overall percentage would be increased.

In the data of the above studies, the wheelchairs users were traveling at a specified speed (1 m/s±10%). If varying speed is found to have a significant effect on vibration and/or other collected data, speed can be measured (using, for example, a wheel encoder, an accelerometer, a GPS system, etc.) and speed may be incorporated into the SVM model.

The foregoing description and accompanying drawings set forth a number of representative embodiments at the present time. Various modifications, additions and alternative designs will, of course, become apparent to those skilled in the art in light of the foregoing teachings without departing from the scope hereof, which is indicated by the following claims rather than by the foregoing description. All changes and variations that fall within the meaning and range of equivalency of the claims are to be embraced within their scope.

What is claimed is:

1. A pathway measurement system, comprising:
a rigid frame,
a processor system,
a mobility system attached to the frame, the mobility system comprising at least one movable element which is adapted to contact a surface of a pathway via which the frame may be moved relative to the pathway,
and at least one sensor adapted to measure at least one characteristic of a pathway,
the pathway measurement system having a first mode of operation in which the mobility system moves the frame along the pathway to move the at least one sensor relative to the pathway, the at least one sensor being connected to the pathway measurement system such that a distance between the at least one sensor and an axis of rotation of one of the moveable elements remains constant in the first mode of operation, the processor system being configured to determine a roughness index or a surface characterization associated with a particular type of vehicle from data measured by the at least one sensor, the roughness index or surface characterization is determined based upon a wheel diameter or other physical parameters of the particular type of vehicle.

2. The pathway measurement system of claim 1 wherein the at least one sensor measures a variable related to surface roughness of the pathway.

3. The pathway measurement system of claim 1 wherein the at least one sensor measures a distance from the sensor to a surface of the pathway without contacting the pathway.

4. The pathway measurement system of claim 1 wherein the at least one sensor measures a distance from the sensor to a surface of the pathway on the basis of light energy reflected from the surface of the pathway to the sensor.

5. The pathway measurement system of claim 4 wherein the at least one sensor projects light which is in line with the direction of travel of the pathway measurement system, orthogonal to the direction of travel of the pathway measurement system or at any angle within the plane of travel of the pathway measurement system.

6. The pathway measurement system of claim 1 further comprising at least one of a sensor system to measure a distance the pathway measurement system travels along the pathway via the mobility system, a sensor system to measure running slope or a sensor system to measure cross slope.

7. The pathway measurement system of claim 1 wherein a profile of the surface is determined and a path of a wheel having the wheel diameter over the profile is determined.

8. The pathway measurement system of claim 7 wherein the roughness index is calculated as the sum of the vertical deviations of the wheel having the wheel diameter normalized by the distance traveled.

9. The pathway measurement system of claim 1 further comprising a location system to determine the position of the pathway measurement system and associate that position with the at least one characteristic of the pathway.

10. The pathway measurement system of claim 1 wherein the at least one sensor comprises an accelerometer, a gyroscope or an inertial measurement unit.

11. A pathway measurement system, comprising:
a rigid frame,
a mobility system attached to the frame, the mobility system comprising at least one movable element which is adapted to contact a surface of a pathway via which the frame may be moved relative to the pathway,
at least a first sensor adapted to measure at least one characteristic of a pathway, the pathway measurement system having a first mode of operation in which the mobility system moves the frame along the pathway to move the at least a first sensor relative to the pathway, the at least a first sensor being connected to the pathway measurement system such that a distance between the at least a first sensor and an axis of rotation of one of the moveable elements remains constant in the first mode of operation, and at least a second sensor, wherein data from the at least a second sensor is used to filter or correct data from the at least a first sensor.

12. A pathway measurement system, comprising:
a rigid frame,
a mobility system attached to the frame, the mobility system comprising at least one movable element which is adapted to contact a surface of a pathway via which the frame may be moved relative to the pathway, and
a personal communication device comprising at least one sensor adapted to measure at least one characteristic of a pathway,
the pathway measurement system having a first mode of operation in which the mobility system moves the frame along the pathway to move the at least one sensor relative to the pathway, the at least one sensor being connected to the pathway measurement system such that a distance between the at least one sensor and an axis of rotation of one of the moveable elements remains constant in the first mode of operation.

13. A method of characterizing a pathway, comprising:
providing a pathway measurement system, comprising a frame, a mobility system attached to the frame and comprising at least one moveable element which is adapted to contact a surface of the pathway, via which the frame is moveable relative to a pathway, and at least one sensor adapted to measure at least one characteristic of a pathway, the at least one sensor being connected to the pathway measurement system such that a distance between the at least one sensor and an axis of rotation of the at least one moveable element remains constant, and operating the pathway measurement system in a first mode of operation in which the mobility system moves the frame along the pathway to move the at least one sensor relative to the pathway, and analyzing data from the pathway measurement system to characterize the pathway, wherein the measurement system further comprises a personal communication device comprising the at least one sensor.

14. A method of characterizing a pathway, comprising:
providing a plurality of pathway measurement systems, each of the pathway measurement systems comprising a frame, a mobility system attached to the frame and comprising at least one moveable element which is adapted to contact a surface of the pathway, via which the frame is moveable relative to a pathway, and at least one sensor adapted to measure at least one characteristic of a pathway, the at least one sensor being connected to the pathway measurement system such that a distance between the at least one sensor and an axis of rotation of the at least one moveable element remains constant in a first mode of operation, and operating each of the plurality of pathway measurement systems in the first mode of operation in which the mobility system moves the frame along the pathway to move the at least one sensor relative to the pathway analyzing data from each of the plurality of pathway measurement systems to characterize the pathway, wherein each of the plurality of pathway measurement systems further comprises a personal communication device comprising the at least one sensor.

15. The method of claim 14 wherein at least one of the plurality of pathway measurement systems is a personal mobility device, a stroller a cart, or another robotically propelled device.

16. The method of claim 14 wherein the personal communication device comprises a smartphone.

* * * * *